US012645870B2

(12) United States Patent
Luo et al.

(10) Patent No.: US 12,645,870 B2
(45) Date of Patent: Jun. 2, 2026

(54) METHODS, SYSTEM, APPARATUSES AND ELECTRONIC DEVICE FOR INFORMATION REFERENCING

(71) Applicant: Beijing Zitiao Network Technology Co., Ltd., Beijing (CN)

(72) Inventors: Mingtao Luo, Beijing (CN); Li Xu, Beijing (CN); Wenjian Chen, Beijing (CN); Zhuozhen Wen, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 86 days.

(21) Appl. No.: 18/518,048

(22) Filed: Nov. 22, 2023

(65) Prior Publication Data

US 2024/0086632 A1     Mar. 14, 2024

Related U.S. Application Data

(63) Continuation of application No. PCT/CN2022/103826, filed on Jul. 5, 2022.

(30) Foreign Application Priority Data

Jul. 6, 2021    (CN) .......................... 202110765142.7

(51) Int. Cl.
    *G06F 40/18*       (2020.01)
    *G06F 16/3331*    (2025.01)
             (Continued)

(52) U.S. Cl.
    CPC .................................... *G06F 40/18* (2020.01)

(58) Field of Classification Search
    None
    See application file for complete search history.

(56) References Cited

U.S. PATENT DOCUMENTS 6,157,934 A * 12/2000 Khan ...................... G06Q 10/10
                                          715/769
8,307,119 B2 * 11/2012 Rochelle ................... G06F 8/34
                                          709/248

(Continued)

FOREIGN PATENT DOCUMENTS

| CN | 101030857 A | 9/2007 |
| CN | 101226573 A | 7/2008 |

(Continued)

OTHER PUBLICATIONS

International Search Report for International Patent Application No. PCT/CN2022/103826, mailed Sep. 16, 2022 (6 pages).

(Continued)

*Primary Examiner* — Mustafa A Amin
(74) *Attorney, Agent, or Firm* — Astute IP Law Group

(57) ABSTRACT

The embodiments of the disclosure disclose methods, a system, apparatuses, and an electronic device for information referencing. A specific embodiment of the method includes: in response to creating a target formula, determining parameters of the target formula; generating an identification token of the target formula with a first target information, wherein the first target information includes a user identification of a target user, an identification of the referencing document, the identification of the referenced document and the identification of the referenced region, and the target user is a user creating the target formula; receiving a first verification result returned based on a second target information, wherein the second target information comprises the identification token and the first target information; and performing information presentation in the referencing document based on the first verification result.

18 Claims, 11 Drawing Sheets

(51) Int. Cl.

| | |
|---|---|
| *G06F 21/60* | (2013.01) |
| *G06F 21/64* | (2013.01) |
| *G06F 40/106* | (2020.01) |
| *G06F 40/117* | (2020.01) |

(56) References Cited

U.S. PATENT DOCUMENTS

| | | | | |
|---|---|---|---|---|
| 10,552,530 | B1 * | 2/2020 | Karpel | .................. H04L 63/102 |
| 2003/0005121 | A1 | 1/2003 | Washio et al. | |
| 2005/0034060 | A1 | 2/2005 | Kotler et al. | |
| 2008/0172597 | A1 | 7/2008 | DeHaan | |
| 2019/0138587 | A1 * | 5/2019 | Silk | ....................... G06F 40/197 |
| 2020/0167321 | A1 * | 5/2020 | Sheehan | ............. G06F 21/6209 |
| 2020/0410161 | A1 * | 12/2020 | Rault | ...................... G06F 40/18 |

FOREIGN PATENT DOCUMENTS

| | | | |
|---|---|---|---|
| CN | 101561826 | A | 10/2009 |
| CN | 103578073 | A | 2/2014 |
| CN | 103907110 | A | 7/2014 |
| CN | 107710189 | A | 2/2018 |
| CN | 108369577 | A | 8/2018 |
| CN | 109684616 | A | 4/2019 |
| CN | 109829144 | A | 5/2019 |
| CN | 111819534 | A | 10/2020 |
| CN | 111858518 | A | 10/2020 |
| CN | 112528595 | A | 3/2021 |
| CN | 113032633 | A | 6/2021 |
| CN | 113361231 | A | 9/2021 |
| JP | H06-110763 | A | 4/1994 |
| JP | 2001051905 | A | 2/2001 |

OTHER PUBLICATIONS

Office Action in CN202110765142.7, mailed Dec. 15, 2023, 19 pages.

Weihua, "Research and Implementation of an Electronic Document Management System Based on Multilevel Security", A Master Thesis Submitted to University of Electronic Science and Technology of China, Mar. 15, 2016, 71 pages, with English Abstract.

Notification to Grant Patent Right for Invention for Chinese Patent Application No. 202110765142.7, mailed on Apr. 26, 2024, 7 pages.

\* cited by examiner

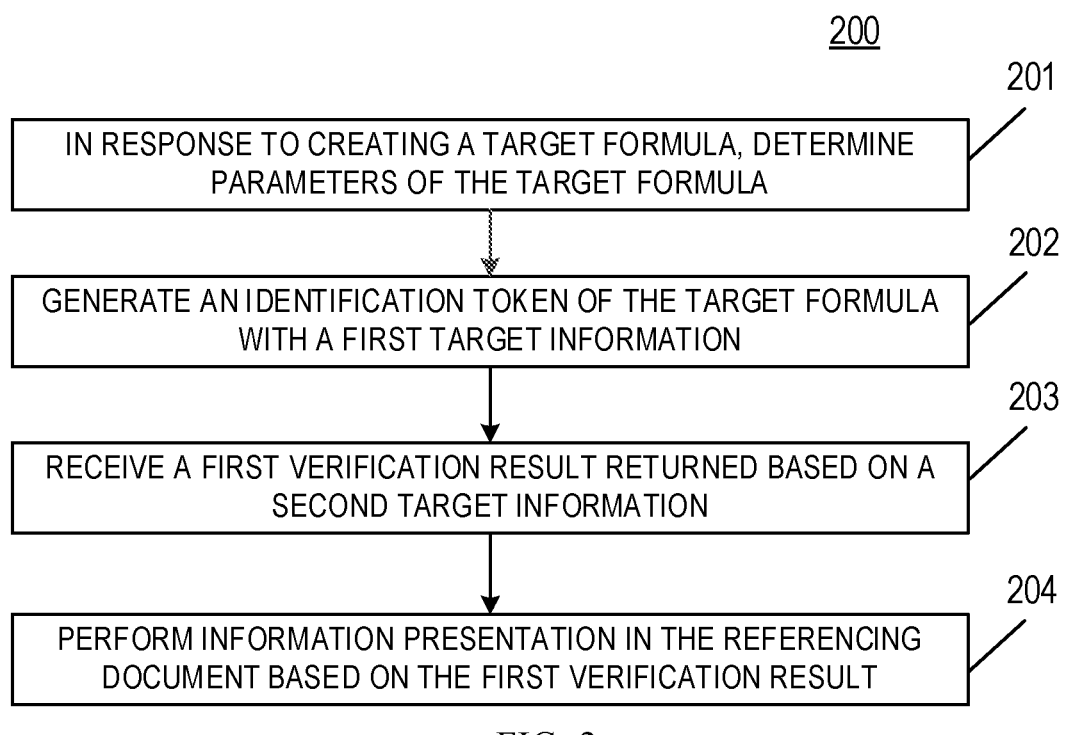

200

201

IN RESPONSE TO CREATING A TARGET FORMULA, DETERMINE
PARAMETERS OF THE TARGET FORMULA

202

GENERATE AN IDENTIFICATION TOKEN OF THE TARGET FORMULA
WITH A FIRST TARGET INFORMATION

203

RECEIVE A FIRST VERIFICATION RESULT RETURNED BASED ON A
SECOND TARGET INFORMATION

204

PERFORM INFORMATION PRESENTATION IN THE REFERENCING
DOCUMENT BASED ON THE FIRST VERIFICATION RESULT

FIG. 2

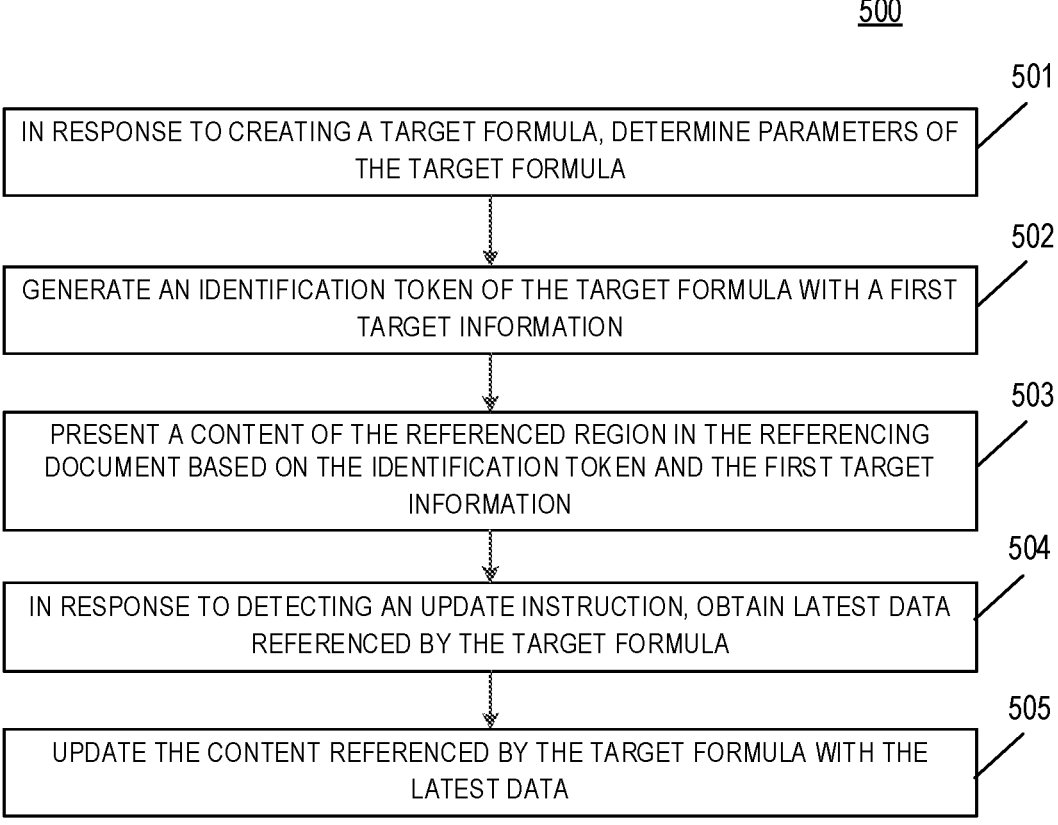

500

501
IN RESPONSE TO CREATING A TARGET FORMULA, DETERMINE PARAMETERS OF THE TARGET FORMULA

502
GENERATE AN IDENTIFICATION TOKEN OF THE TARGET FORMULA WITH A FIRST TARGET INFORMATION

503
PRESENT A CONTENT OF THE REFERENCED REGION IN THE REFERENCING DOCUMENT BASED ON THE IDENTIFICATION TOKEN AND THE FIRST TARGET INFORMATION

504
IN RESPONSE TO DETECTING AN UPDATE INSTRUCTION, OBTAIN LATEST DATA REFERENCED BY THE TARGET FORMULA

505
UPDATE THE CONTENT REFERENCED BY THE TARGET FORMULA WITH THE LATEST DATA

601
IN RESPONSE TO RECEIVING AN IDENTIFICATION TOKEN AND TARGET INFORMATION OF A TARGET FORMULA SENT BY A USER TERMINAL, WITH THE IDENTIFICATION TOKEN AND THE TARGET INFORMATION OF THE TARGET FORMULA, VERIFY A REFERENCING PERMISSION OF THE TARGET FORMULA TO OBTAIN A FIRST VERIFICATION RESULT

602
RETURN THE FIRST VERIFICATION RESULT TO THE USER TERMINAL

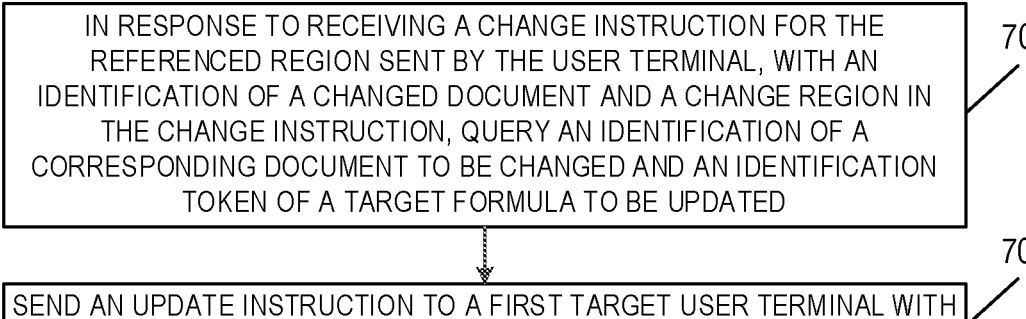

IN RESPONSE TO RECEIVING A CHANGE INSTRUCTION FOR THE REFERENCED REGION SENT BY THE USER TERMINAL, WITH AN IDENTIFICATION OF A CHANGED DOCUMENT AND A CHANGE REGION IN THE CHANGE INSTRUCTION, QUERY AN IDENTIFICATION OF A CORRESPONDING DOCUMENT TO BE CHANGED AND AN IDENTIFICATION TOKEN OF A TARGET FORMULA TO BE UPDATED    701

SEND AN UPDATE INSTRUCTION TO A FIRST TARGET USER TERMINAL WITH THE IDENTIFICATION OF THE DOCUMENT TO BE CHANGED    702

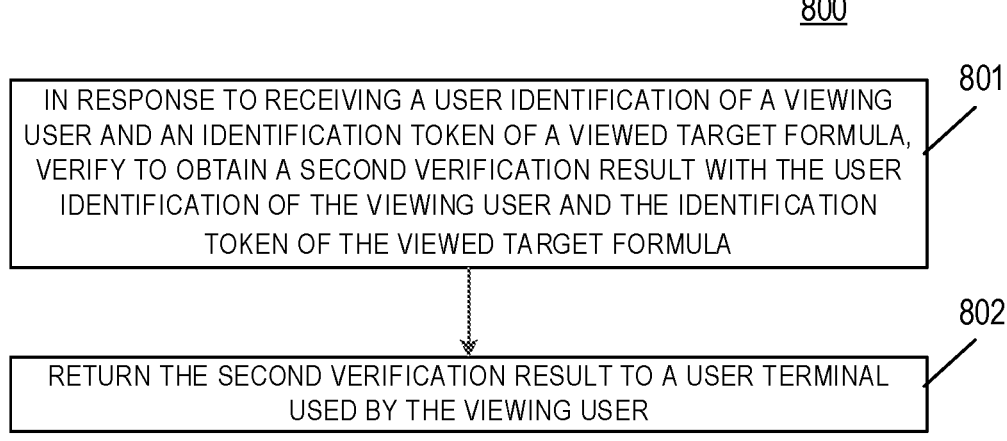

IN RESPONSE TO RECEIVING A USER IDENTIFICATION OF A VIEWING USER AND AN IDENTIFICATION TOKEN OF A VIEWED TARGET FORMULA, VERIFY TO OBTAIN A SECOND VERIFICATION RESULT WITH THE USER IDENTIFICATION OF THE VIEWING USER AND THE IDENTIFICATION TOKEN OF THE VIEWED TARGET FORMULA    801

RETURN THE SECOND VERIFICATION RESULT TO A USER TERMINAL USED BY THE VIEWING USER    802

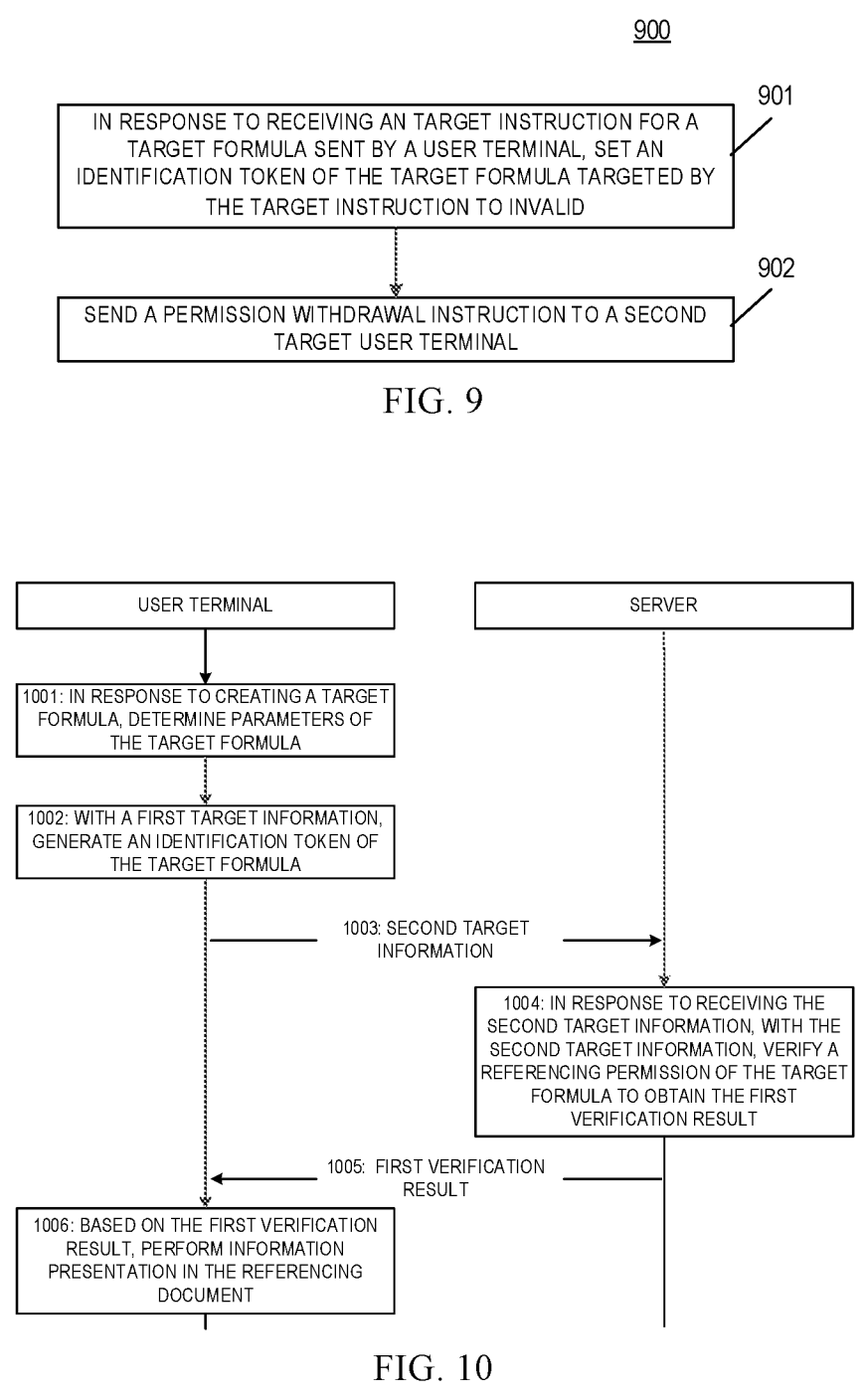

IN RESPONSE TO RECEIVING AN TARGET INSTRUCTION FOR A TARGET FORMULA SENT BY A USER TERMINAL, SET AN IDENTIFICATION TOKEN OF THE TARGET FORMULA TARGETED BY THE TARGET INSTRUCTION TO INVALID

902

SEND A PERMISSION WITHDRAWAL INSTRUCTION TO A SECOND TARGET USER TERMINAL

FIG. 9

USER TERMINAL

SERVER

1001: IN RESPONSE TO CREATING A TARGET FORMULA, DETERMINE PARAMETERS OF THE TARGET FORMULA

1002: WITH A FIRST TARGET INFORMATION, GENERATE AN IDENTIFICATION TOKEN OF THE TARGET FORMULA

1003: SECOND TARGET INFORMATION

1004: IN RESPONSE TO RECEIVING THE SECOND TARGET INFORMATION, WITH THE SECOND TARGET INFORMATION, VERIFY A REFERENCING PERMISSION OF THE TARGET FORMULA TO OBTAIN THE FIRST VERIFICATION RESULT

1005: FIRST VERIFICATION RESULT

1006: BASED ON THE FIRST VERIFICATION RESULT, PERFORM INFORMATION PRESENTATION IN THE REFERENCING DOCUMENT

APPARATUS FOR
INFORMATION REFERENCING

1601

FIRST VERIFICATION UNIT

1602

FIRST RETURNING UNIT

1700

PROCESSING
APPARATUS  — 1701          ROM  — 1702          RAM  — 1703

— 1704

I/O INTERFACE  — 1705

INPUT
APPARATUS          OUTPUT
APPARATUS          STORAGE
APPARATUS          COMMUNICATION
APPARATUS

— 1706          — 1707          — 1708          — 1709

METHODS, SYSTEM, APPARATUSES AND ELECTRONIC DEVICE FOR INFORMATION REFERENCING

CROSS REFERENCE

The disclosure is a continuation of PCT application Ser. No. PCT/CN2022/103826, filed on Jul. 5, 2022, titled "INFORMATION CITING METHOD, SYSTEM AND APPARATUS, AND ELECTRONIC DEVICE", which claims priority to Chinese Patent Application No. 202110765142.7, filed on Jul. 6, 2021, titled "INFORMATION CITING METHOD, SYSTEM AND APPARATUS, AND ELECTRONIC DEVICE", the entire contents of both applications are incorporated herein by reference.

FIELD

The embodiments of the present disclosure relate to the field of computer technology, specifically to methods, a system, apparatuses, and an electronic device for information referencing.

BACKGROUND

In online spreadsheets, users often need to copy contents of a data source table and paste it into other tables that reference the data source. When the data source table changes, the user needs to perform the copy-paste operation on the data source again to update the other data. This can lead to an unfriendly user experience such as slow data update and repetitive work. Therefore, how to reference the data source conveniently and update other tables in real time when the data source changes is an urgent problem to be solved.

SUMMARY

This summary is provided to briefly introduce concepts, which will be described in detail in the following detailed description. This summary is not intended to identify key features or necessary features of the claimed technical solution, nor is it intended to limit the scope of the claimed technical solution.

In the first aspect, the embodiments of the present disclosure provide a method of information referencing, including: in response to creating a target formula, determining parameters of the target formula, wherein the target formula is used to reference a content of a referenced document in a referencing document, and the parameters comprise an identification of the referenced document and an identification of a referenced region; generating an identification token of the target formula with a first target information, wherein the first target information comprises a user identification of a target user, an identification of the referencing document, the identification of the referenced document and the identification of the referenced region, and the target user is a user creating the target formula; receiving a first verification result returned based on a second target information, wherein the second target information comprises the identification token and the first target information; and performing information presentation in the referencing document based on the first verification result.

In the second aspect, the embodiments of the present disclosure provide a method of information referencing, including: in response to creating a target formula, determining parameters of the target formula, wherein the target formula is used to reference a content of a referenced document in a referencing document, and the parameters comprise an identification of the referenced document and an identification of a referenced region; generating an identification token of the target formula with a first target information, wherein the first target information comprises a user identification of a target user, an identification of the referencing document, the identification of the referenced document and the identification of the referenced region, and the target user is a user creating the target formula; presenting a content of the referenced region in the referencing document based on the identification token and the first target information; in response to detecting an update instruction, obtaining latest data referenced by the target formula, wherein the update instruction is used to update the content of the referenced region; and updating the content referenced by the target formula with the latest data.

In the third aspect, the embodiments of the present disclosure provide a method of information referencing, including: in response to receiving an identification token and target information of a target formula sent by a user terminal, with the identification token and the target information of the target formula, verifying a referencing permission of the target formula to obtain a first verification result, wherein the target formula is used to reference a content of a referenced document in a referencing document, the target information comprises a user identification of a target user, an identification of the referencing document, an identification of the referenced document and an identification of a referenced region, and the target user is a user creating the target formula; and returning the first verification result to the user terminal.

In the fourth aspect, the embodiments of the present disclosure provide an system for information referencing, including: a user terminal configured to in response to creating a target formula, determine parameters of the target formula, with a first target information, generate an identification token of the target formula, send a second target information to a server, receive a first verification result returned by the server, and based on the first verification result, perform information presentation in the referencing document, wherein, the target formula is used to reference a content of a referenced document in a referencing document, and the parameters comprise an identification of the referenced document and an identification of a referenced region, the first target information comprises a user identification of a target user, an identification of the referencing document, the identification of the referenced document and the identification of the referenced region, the target user is a user creating the target formula, and the second target information comprises the identification token and the first target information; the server configured to in response to receiving the second target information, with the second target information, verify a referencing permission of the target formula to obtain the first verification result, and return the first verification result to the user terminal.

In the fifth aspect, the embodiments of the present disclosure provide an apparatus for information referencing, including: a determination unit configured to in response to creating a target formula, determine parameters of the target formula, wherein the target formula is used to reference a content of a referenced document in a referencing document, and the parameters comprise an identification of the referenced document and an identification of a referenced region; a generation unit configured to generate an identification token of the target formula with a first target information, wherein the first target information comprises a user identification of a target user, an identification of the referencing document, the identification of the referenced document and the identification of the referenced region, and the target user is a user creating the target formula; a first receiving unit configured to receive a first verification result returned based on a second target information, wherein the second target information comprises the identification token and the first target information; a first presentation unit configured to perform information presentation in the referencing document based on the first verification result.

In the sixth aspect, the embodiments of the present disclosure provide an apparatus for information referencing, including: a determination unit configured to in response to creating a target formula, determine parameters of the target formula, wherein the target formula is used to reference a content of a referenced document in a referencing document, and the parameters comprise an identification of the referenced document and an identification of a referenced region; a generation unit configured to generate an identification token of the target formula with a first target information, wherein the first target information comprises a user identification of a target user, an identification of the referencing document, the identification of the referenced document and the identification of the referenced region, and the target user is a user creating the target formula; a presentation unit configured to present a content of the referenced region in the referencing document based on the identification token and the first target information; an obtaining unit configured to in response to detecting an update instruction, obtain latest data referenced by the target formula, wherein the update instruction is used to update the content of the referenced region; and an update unit configured to update the content referenced by the target formula with the latest data.

In the seventh aspect, the present embodiments of the present disclosure provide an apparatus for information referencing, including: a first verification unit configured to in response to receiving an identification token and target information of a target formula sent by a user terminal, with the identification token and the target information of the target formula, verify a referencing permission of the target formula to obtain a first verification result, wherein the target formula is used to reference a content of a referenced document in a referencing document, the target information comprises a user identification of a target user, an identification of the referencing document, an identification of the referenced document and an identification of a referenced region, and the target user is a user creating the target formula; and a first returning unit configured to return the first verification result to the user terminal.

In the eighth aspect, the embodiments of the present disclosure provide an electronic device including: one or more processors; and a storage apparatus on which one or more programs are stored, when the one or more programs are executed by the one or more processors, causing the one or more processors to implement a method of information referencing described in the first, second and third aspects.

In the ninth aspect, the embodiments of the present disclosure provide computer-readable medium on which a computer program is stored, wherein the program, when executed by a processor, implements the steps of the method of information referencing described in the first, second and third aspects.

BRIEF DESCRIPTION OF THE DRAWINGS

In combination with the accompanying drawings and with reference to the following detailed description, the above and other features, advantages and aspects of various embodiments of the present disclosure will become more apparent. Throughout the drawings, the same or similar reference numerals represent the same or similar elements. It should be understood that the drawings are illustrative and that the components and elements are not necessarily drawn scale.

FIG. 2 is a flowchart of an embodiment according to the method of information referencing of the present disclosure;

FIG. 5 is a flowchart of another embodiment according to the method of information referencing of the present disclosure;

FIG. 6 is a flowchart of another embodiment according to the method of information referencing of the present disclosure;

FIG. 7 is a flow chart of another embodiment of updating a referenced content according to the method of information referencing of the present disclosure;

FIG. 8 is a flow chart of an embodiment of verifying a viewing permission of a viewing user according to the method of information referencing of the present disclosure;

FIG. 9 is the flow chart of an embodiment of withdrawing a referencing permission of a target formula according to the method of information referencing of the present disclosure;

FIG. 10 is a time sequence diagram of an embodiment according to a system for information referencing of the present disclosure;

DETAILED DESCRIPTION

The embodiments of the present disclosure will be described in more detail with reference to the accompanying drawings, in which some embodiments of the present disclosure have been illustrated. However, it should be understood that the present disclosure can be implemented in various manners, and thus should not be construed to be limited to embodiments disclosed herein. On the contrary, those embodiments are provided for the thorough and complete understanding of the present disclosure. It should be understood that the drawings and embodiments of the present disclosure are only used for illustration, rather than limiting the protection scope of the present disclosure.

It should be understood that various steps described in method implementations of the present disclosure may be performed in different order and/or in parallel. Furthermore, method implementations may include additional steps and/or omit steps that are shown. The scope of the present disclosure is not limited in this regard.

The terms "comprise" and its variants used herein are to be read as open terms that mean "include, but is not limited to." The term "based on" is to be read as "based at least in part on." The term "one embodiment" is to be read as "at least one embodiment," the term "another embodiment" is to be read as "at least one another embodiment," and the term "some embodiments" is to be read as "at least some embodiments." Other definitions, explicit and implicit, might be included below.

It should be noted that concepts "first," "second" and the like mentioned in the present disclosure are only used to distinguish between different apparatuses, modules or units, rather than limiting the order or interdependence of the functions performed by these apparatuses, modules or units.

It should be noted that modifications "one" and "more" mentioned in the present disclosure are schematic and not limiting, and should be understood as "one or more" to those skilled in the art unless otherwise specified.

Names of messages or information exchanged between the plurality of apparatuses in implementations of the present disclosure are used for illustrative purposes only and are not intended to limit the scope of those messages or information.

Figure 1:
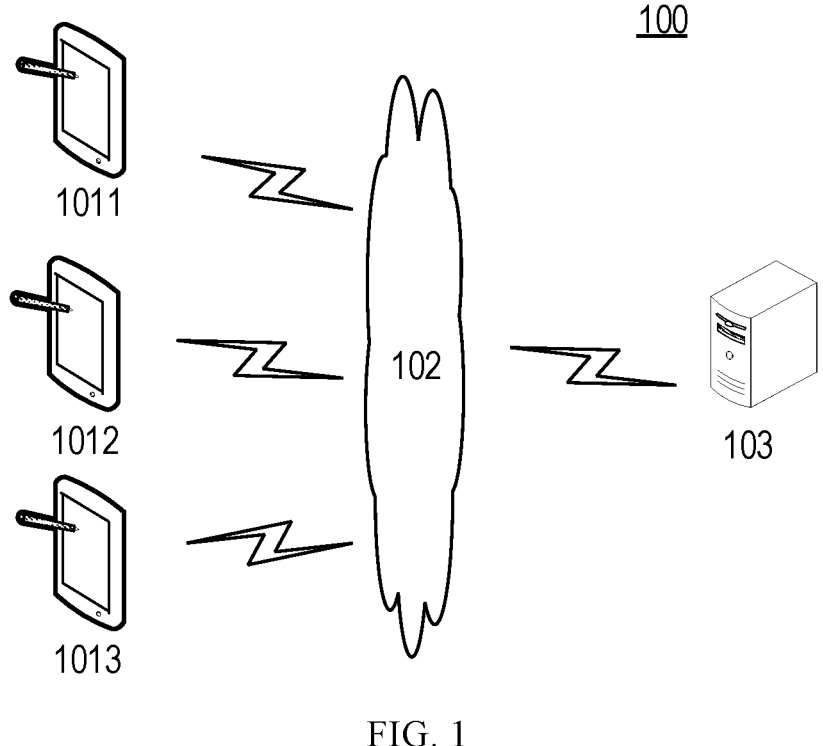
FIG. 1 is an exemplary system architecture diagram to which various embodiments of the present disclosure may be applied.

FIG. 1 illustrates an exemplary system architecture 100 which may apply the embodiments of the method of information referencing of the present disclosure.

As shown in FIG. 1, the system architecture 100 may include a terminal device 1011, a terminal device 1012, a terminal device 1013, a network 102, and a server 103. The network 102 is a medium for providing a communication link between the terminal devices 1011, 1012, 1013 and the server 103. The network 102 may include various connection types, such as wired, wireless communication links, or fiber optic cables, and the like.

Users may use the terminal devices 1011, 1012, 1013 to interact with the server 103 through the network 102 to send or receive messages, etc. For example, the terminal devices 1011, 1012, 1013 may send an identification token of a target formula and target information to a server 103. Various communication client applications can be installed on the terminal devices 1011, 1012, 1013, such as document editing applications, graphics editing applications, instant messaging software, and enterprise collaboration platforms.

The terminal devices 1011, 1012, 1013 may determine parameters of the above target formula in response to creating the target formula; after that, an identification token of the above target formula may be generated with a first target information including a user identification of a target user, an identification of the above referencing document, the identification of the above referenced document and the identification of the above referenced region; then, a second target information including the above identification token and the above first target information may be sent to the server 103 to receive a first verification result returned by the server 103; finally, the information presentation may be performed in the referencing document based on the above first check result.

The terminal devices 1011, 1012, 1013 may be hardware or software. when the terminal devices 1011, 1012, 1013 are hardware, they may be various electronic devices with display screens and support information exchange, including but not limited to smartphones, tablets, laptops, etc. When the terminal devices 1011, 1012, 1013 are software, they may be installed in the electronic devices listed above described. They may be implemented as multiple software or software modules (such as multiple software or software modules configured to provide distributed services), or as a single software or software module. No specific limitations are made here.

The server 103 may be a server that provides various services. For example, it may be a server that processes the identification token and target information of the target formula sent by the terminal devices 1011, 1012, 1013, and sends the obtained verification result to a server of the terminal devices 1011, 1012, 1013. The server 103 may first in response to receiving the identification token and target information of the target formula sent by the terminal devices 1011, 1012 and 1013, with the identification token and target information of the above target formula, verify a referencing permission of the above target formula to obtain a first verification result; after that, the above first check result may be returned to the terminal devices 1011, 1012, 1013.

It should be noted that server 103 may be hardware or software. When the server 103 is hardware, it may be implemented as a distributed server cluster composed of multiple servers, or as a single server. When the server 103 is software, it may be implemented as multiple software or software modules (such as configured to provide distributed services), or as a single software or software module. No specific limitations are made here.

It should also be noted that the method of information referencing provided in the embodiments of the present disclosure may be performed by the terminal devices 1011, 1012, 1013, then the apparatus for information referencing may be set in the terminal devices 1011, 1012, 1013. The method of information referencing provided by the embodiments of the present disclosure may also be performed by the server 103, then the apparatus for information referencing may also be set in the server 103.

It should be understood that the number of terminal devices, networks, and servers in FIG. 1 is merely illustrative and may have any number of terminal devices, networks, and servers depending on implementation needs.

Continuing with reference to FIG. 2, the flow 200 of an embodiment of the method of information referencing according to the present disclosure is shown. The method of information referencing is typically applied to a user terminal and includes the following steps.

Step 201, in response to creating a target formula, determine parameters of the target formula.

In this embodiment, an execution actor of the method of information referencing (such as the terminal device shown in FIG. 1) may detect if the user is creating a target formula in the document. The above target formula may also be referred to as a cross-table referenced formula and may be used to reference a content of the referenced document within the referencing document.

As an example, the user may create the target formula in the following way: the cross-table referencing selection panel may be presented in the document. The user may select the document as the referenced document and select a region in the referenced document as a referenced region in the cross-table reference selection panel of the current displayed document (referencing document); after that, click the "confirm" icon, and the target formula is created successfully.

As another example, the user may also create the target formula in the following way: the user may create the target formula by entering an identification of the referenced document (e.g., url) and a range of the referenced region in an edit box of the target formula.

Later, if it the creation of the target formula is detected, the above execution actor may determine the parameters of the target formula. The above parameters may include an identification and referenced region of the referenced document.

As an example, if the target formula IMPORTRANGE is created ("xxx.com", "A1"), the execution actor may determine that the identification of the referenced document of the target formula is "xxx.com" and the identification of the referenced region is the region "A1".

As another example, if the target formula IMPORTRAN-GE(A1, B1) is created, the execution actor may obtain the identification of the referenced document from the cell A1 in the currently presented document, and the identification of the referenced region from the cell B1 in the currently presented document.

Step 202, generate an identification token of the target formula with a first target information.

In this embodiment, the execution actor may generate the identification token of the above target formula with the first target information. The identification token of the target formula is typically used to uniquely identify the target formula and may be characterized as a string. The first target information above usually includes a user identification of a target user, an identification of the referencing document (currently presented document), the identification of the referenced document (data source document), the identification of the referenced region, and the target user is a user creating the target formula.

Here, the execution actor may encrypt the user identification of the target user, the identifier of the referencing document, the identifier of the referenced document and the identifier of the referenced region with a predetermined encryption Algorithm (such as MD5 (MD5 Message-Digest Algorithm)) to obtain the identification token of the target formula.

Step 203, receive a first verification result returned based on a second target information.

In this embodiment, the execution actor may receive the first verification result returned based on the second object information. Here, the second object information may include the identification token and the first target information.

Step 204, perform information presentation in the referencing document based on the first verification result.

In this embodiment, the execution actor may present information in the referencing document based on the first verification result. If the first verification result characterizes verification failure, the execution actor may present the information of the verification failure in the referencing document. For example, the information characterizing verification failure may include an error code, and one error code corresponds to one reason for the verification failure.

The method provided in the above embodiments of the present disclosure provides a more concise and efficient cross-table referencing implementation scheme by creating information referencing relationships between documents, compared with the operation performed by the user by copying the content from one document to another document.

In some optional implementations, the execution actor may receive the first verification result returned based on the second target information in the following way: the execution actor may send the second target information to a target server. The above target server may be a server that performs permission verification against the target formula. For example, it may be a server that verifies whether the user has permission to reference the content of the referenced region in the referenced document. The target server may generate and return the first verification result based on the second target information mentioned above. After the user performs an action, the execution actor usually sends an operation instruction to the target server. Here, after the user executes setcell action (edit cell instruction), the second target information may be added to the operation instruction and sent to the target server.

In some optional implementations, if the first verification result characterizes a successful verification, the first verification result may include a regional content of the referenced region in the referenced document. The execution actor may perform information presentation in the referenced document based on the first verification result in the following ways: if the first verification result characterizes a successful verification, the execution actor may present the regional content in the referencing document.

In some optional implementations, the execution actor may detect whether the user performs the target operation on the target formula. The target operation may include a modification operation or a deletion operation, that is, the execution actor may detect whether the user performs the modification operation or deletion operation on the target formula. If the user is detected to perform the target operation on the target formula, the execution actor may send the target instruction to the target server. The target instruction may include a modification instruction or a deletion instruction for a target formula targeted by the target operation.

In some optional implementations, the execution actor may determine whether it has received permission withdrawal instructions sent by the target server. In this case, the above permission withdrawal instruction is usually sent to the above executive actor after the above target server receives the instruction to modify or delete the target formula sent by the user terminal. The permission withdrawal instruction may include an identification token of an invalid target formula, and the permission withdrawal instruction is used to withdraw the referencing permission of the invalid target formula. If the permission withdrawal instruction is received, the execution actor may use the identification token of the invalid target formula in the above permission withdrawal instruction to withdraw the content referenced by the invalid target formula in the current presented document, that is, it will not display the content referenced by the invalid target formula in the current presented document. In this way, the identification token of the modified or deleted target formula becomes invalid and cannot be recovered, which may prevent illegal data obtaining through the invalid identification token and ensure the security of the data.

In some optional implementations, after the content referenced by the invalid target formula in the currently presented document is withdrawn, the execution actor may present a prompt information used to prompt to re-verify the referencing permission of the invalid target formula.

In some optional implementations, the second target information may also include a synchronization style identification used to characterize whether to synchronize a style of the referenced region when the content of the referenced region is referenced in the referencing document. If the synchronization style identification is "1" or "T", it may be used to characterize the synchronization of the style of the referenced region when the content of the referenced region is referenced in the referencing document. If the synchronization style identification is "0" or "F", it may characterize no synchronization of the style of the referenced region when the content of the referenced region is referenced in the referencing document. The style of the referenced region may include but is not limited to at least one of the following: a font of the referenced region, a font size of the referenced region, a font color of the referenced region, whether the referenced region is highlighted color, whether the referenced region is bolded, whether the referenced region is tilted, whether the referenced region is underlined, a paragraph format of the referenced region, and a background color of the referenced region.

In some optional implementations, the first verification result includes a verification result that characterizes whether the target user has a permission to reference a content in the referenced document. If it is verified that the target user has the permission to reference the content of the referenced document, the first verification result may be characterized as 1 or T. If it is verified that the target user does not have the permission to reference the content in the referenced document, the first verification result may be characterized as 0 or F.

In some optional implementations, the first verification result may also include a verification result of a legality for the first target information. The first target information usually includes the user identification of the target user, the identification of the referencing document, the identification of the referenced document, and the identification of the referenced region. The target server may verify the legality of the first target information in the following ways: the target server may verify whether the identification of the referenced document exists and may also verify whether a referenced region indicated by the identification of the referenced region exceeds the document region of the referenced document. If the identification of the referenced document exists and a referenced region indicated by the identification of the referenced region does not exceed the document region of the referenced document, the verification may be successful. If the identification of the referenced document does not exist or a referenced region indicated by the identification of the referenced region exceeds the document region of the referenced document, then the verification may be failed.

In some optional implementations, the above target formula may include a copy function, a table link and an identification of the referenced region, wherein the copy function is used to copy a content of a referenced table into a reference table, and the table link is a link of the referenced table. The above target formula may be in the form of IMPORTRANGE(String spreadsheet_url, String range_string, (Optional) Boolean if_sync_formatting), herein, IMPORTRANGE is a copy function, which may copy a content in one table to another table; spreadsheet_url usually refers to the table link, which is Uniform Resource Locator (url) link of the data source table; range_string usually refers to a string of the referenced region, that is, the identification of the referenced region; if_sync_formatting usually refers to whether the synchronization style is used, the parameter whether the synchronization style is used is optional, whether synchronization style indicates whether the referenced region style is synchronized when the content of the data source table is referenced in a table. The style of referenced region may include but is not limited to at least one of the following: a font of the referenced region, a font size of referenced region, a font color of the referenced region, whether the referenced region is highlighted color, whether the referenced region is bolded, whether the referenced region is tilted, whether the referenced region is underlined, a paragraph format of the referenced region, and a background color of the referenced region.

In some optional implementations, the referencing document or the referenced document includes one of: a spreadsheet document, an online table document, or an online database table document.

Figure 3:
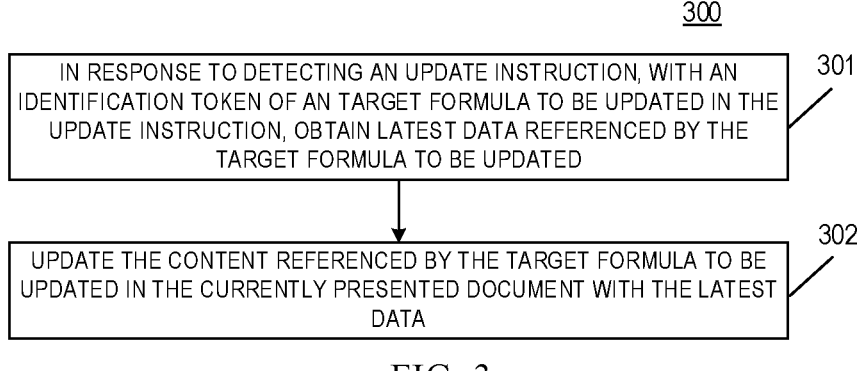
FIG. 3 is a flowchart of an embodiment of updating a referenced content according to the method of information referencing of the present disclosure.

Continuing with reference to FIG. 3, a flow 300 of an embodiment of updating a referenced content according to the method of information referencing of the present disclosure is shown. The method of updating the referenced content, which is generally applied to the user terminal, includes the following steps.

Step 301, in response to detecting an update instruction, with an identification token of a target formula to be updated in the update instruction, obtain latest data referenced by the target formula to be updated.

In this embodiment, the execution actor of the method of information referencing (e.g., the terminal device shown in FIG. 1) may determine whether the update instruction is detected. The above update instruction may be used to update the content referenced by the target formula in the currently presented document. The above update instruction usually includes the identification token of the target formula to be updated.

If the update instruction is detected, the execution actor may use the identification token of the target formula to be updated in the update instruction to obtain the latest data referenced by the target formula to be updated from the target server.

Here, when a target formula is created, a referencing relationship chain of the target formula (that is, a correspondence between the referencing document and the referenced document) is usually maintained in the target server. When the content in the referenced region of the referenced document is changed, the target server usually obtains a notification of content changing and find a document that needs to be changed through the referencing relationship chain as a document to be notified. The target server may send the update instruction to the user terminal that opens the document to be notified.

Step 302, update the content referenced by the target formula to be updated in the currently presented document with the latest data.

In this embodiment, the execution actor may use the latest data to update the content referenced by the target formula to be updated in the currently presented document, so that the updated content of the referenced region may be presented in the currently presented document.

The method provided by the above embodiments in the present disclosure may obtain the latest data to update the content of the referencing region in the referencing document when the content of the referenced region in the referenced document is changed, thus ensuring the real-time update of the data.

In some optional implementations, the update instruction may be generated by: in response to detecting that a current time is a predetermined time, the execution actor may generate the update instruction. If the target formula in the currently presented document exits, the execution actor may set a timer. If the current time is the predetermined time, the execution actor may request the latest data of the target formula in the currently presented document from the target server, so as to ensure the timeliness and effectiveness of the data update.

Figure 4:
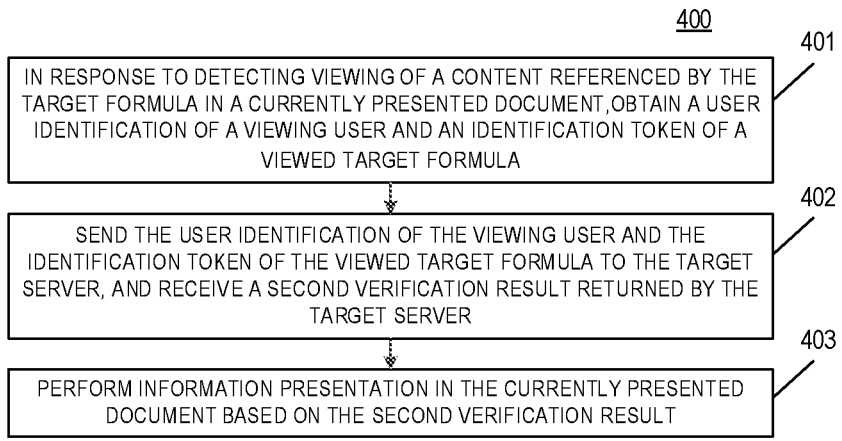
FIG. 4 is a flowchart of an embodiment of viewing a target formula according to the method of information referencing of the present disclosure.

Continuing with reference to FIG. 4, a flow 400 of an embodiment of viewing a target formula according to the method of information referencing of the present disclosure is shown. The method of viewing the target formula, which is generally applied to the user terminal, includes the following steps.

Step 401, in response to detecting viewing of a content referenced by the target formula in a currently presented document, obtain a user identification of a viewing user and an identification token of a viewed target formula.

In this embodiment, the execution actor of the method of information referencing (e.g., the terminal device shown in FIG. 1) may detect whether the user is viewing the content referenced by the target formula in the currently presented document.

As an example, if the execution actor detects that the user opens a document and the target formula exits in the document, it may determine that the user is viewing the content referenced by the target formula in the currently presented document.

As another example, if the execution actor detects that the user is browsing the currently presented document and that the browsed region is the region referenced by the target formula, then it may be determined that the user is viewing the content referenced by the target formula in the currently presented document.

If viewing the content referenced by the target formula in the currently presented document is detected, then the execution actor may obtain the user identification of the viewing user and the identification token of the viewed target formula.

It should be noted that if it detects that the user opens a document and there is a target formula in the document, it is determined that the user is viewing the content referenced by the target formula in the currently presented document. The above execution actor may obtain identification tokens of all the target formulas in the opened document.

Step 402, send the user identification of the viewing user and the identification token of the viewed target formula to the target server, and receive a second verification result returned by the target server.

In this embodiment, the above execution actor may send, to the target server, a user identification token of the viewing user and the identification token of the viewed target formula. The target server may use the user identification of the viewing user and the identification token of the viewed target formula to verify whether the viewing user has the permission to view the content referenced by the viewed target formula.

Specifically, the target server may use the identification token of the target formula to query the user identification set of the users who may view the content referenced by the viewed target formula. Then, it may be determined whether the user identification of the viewing user exists in the user identification set. If the user identification of the viewing user exists in the user identification set, the target server may determine that the viewing user has the permission to view the content referenced by the viewed target formula. At this time, the target server may generate a verification result characterizing that the viewing user has the permission to view the content referenced by the viewed target formula. If the user identification of the above viewing user does not exist in the above user identification set, then the target server may determine that the above viewing user does not have the permission to view the content referenced by the above viewed target formula. At this time, the target server may generate a verification result characterizing that the viewing user does not have the permission to view the content referenced by the viewed target formula.

After that, the execution actor may receive the second verification result returned by the target server.

Step 403, perform information presentation in the currently presented document based on the second verification result.

In this embodiment, the execution actor may perform information presentation in the currently presented document based on the second verification result described above. Here, if the second verification result characterizes that the viewing user does not have the permission to view the content referenced by the viewed target formula, then the execution actor may present information in the currently presented document that is used to characterize that the user does not have the viewing permission.

The method provided by the above embodiments of the present disclosure ensures the security of the data by verifying the viewing permission of the viewing user viewing the content referenced by the target formula and performing information presentation in the currently presented document based on the verification result.

In some optional implementations, if the second verification result characterizes that the viewing user has the permission to view the content referenced by the viewed target formula, the second verification result may include the content referenced by the target formula viewed by the viewing user. Based on the second verification result, the execution actor may perform information presentation in the currently presented document in the following ways: the execution actor may present the content referenced by the target formula viewed by the viewing user in the currently presented document.

Further reference is made to FIG. 5, which shows the flow 500 of another embodiment according to the method of information referencing of the present disclosure. The method of information referencing is typically applied to a user terminal and includes the following steps.

Step 501, in response to creating a target formula, determine parameters of the target formula.

In this embodiment, the execution actor of the method of information referencing (e.g., the terminal device shown in FIG. 1) may detect whether the user creates a target formula in the document. The above target formula may also be referred to as a cross-table referenced formula and may be used to reference the content of the referenced document in the referenced document. The above target formula may be in the form of IMPORTRANGE(String spreadsheet_url, String range_string, (Optional) Boolean if_sync_formatting), herein, IMPORTRANGE is a copy function, which may copy a content in one table to another table; spreadsheet_url usually refers to the table link, which is Uniform Resource Locator (url) link of the data source table; range_string usually refers to a string of the referenced region, that is, the identification of the referenced region; if_sync_formatting usually refers to whether the synchronization style is used, the parameter whether the synchronization style is used is optional, whether synchronization style indicates whether the referenced region style is synchronized when the content of the data source table is referenced in a table. The style of referenced region may include but is not limited to at least one of the following: a font of the referenced region, a font size of referenced region, a font color of the referenced region, whether the referenced region is highlighted color, whether the referenced region is bolded, whether the referenced region is tilted, whether the referenced region is underlined, a paragraph format of the referenced region, and a background color of the referenced region.

As an example, the user may create the target formula in the following way: the cross-table referencing selection panel may be presented in the document. The user may select the document as the referenced document and select a region in the referenced document as a referenced region in the cross-table reference selection panel of the current displayed document (referencing document); after that, click the "confirm" icon, and the target formula is created successfully.

As another example, the user may also create the target formula in the following way: the user may create the target formula by entering an identification of the referenced document and a range of the referenced region in an edit box of the target formula.

Later, if the creation of the target formula is detected, the execution actor may determine the parameters of the target formula. The parameters may include the identification and referenced region of the referenced document.

As an example, if the target formula IMPORTRANGE is created ("xxx.com", "A1"), the execution actor may determine that the identification of the referenced document of the target formula is "xxx.com" and the identification of the referenced region is the region "A1".

As another example, if the target formula IMPORTRANGE(A1, B1) is created, the execution actor may obtain the identification of the referenced document from the cell A1 in the currently presented document, and the identification of the referenced region from the cell B1 in the currently presented document.

Step 502, generate an identification token of the target formula with a first target information.

In this embodiment, the execution actor may generate the identification token of the above target formula with the first target information. The identification token of the target formula is typically used to uniquely identify the target formula and may be characterized as a string. The first target information above usually includes a user identification of a target user, an identification of the referencing document (currently presented document), the identification of the referenced document (data source document), the identification of the referenced region, and the target user is a user creating the target formula.

Here, the execution actor may encrypt the user identification of the target user, the identifier of the referencing document, the identifier of the referenced document and the identifier of the referenced region with a predetermined encryption Algorithm to obtain the identification token of the target formula.

Step 503, present a content of the referenced region in the referencing document based on the identification token and the first target information.

In this embodiment, the above execution actor may present the contents of the above referenced region in the above referencing document based on the above identified token and the above first target information.

Here, the execution actor may receive the first verification result returned based on the identification token and the first target information. Here, the first verification result may include a verification result that characterizes whether the target user has a permission to reference the content in the referenced document. If it is verified that the target user has the permission to reference the content in the referenced document, the first verification result may be characterized as 1 or T.

If the first verification result is characterized successful, the first verification result may include the regional content of the referenced region in the referenced document, and the execution actor may present t the above regional content in the referencing document.

Step 504, in response to detecting an update instruction, obtain latest data referenced by the target formula.

In this embodiment, the execution actor may determine whether an update instruction is detected. The update instruction may be used to update the content of the referenced region.

If the update instruction is detected, the execution actor may obtain the latest data referenced by the target formula from the target server.

Here, when a target formula is created, a referencing relationship chain of the target formula (that is, a correspondence between the referencing document and the referenced document) is usually maintained in the target server. When the content in the referenced region of the referenced document is changed, the target server usually obtains a notification of content changing and find a document that needs to be changed through the referencing relationship chain as a document to be notified. The target server may send the update instruction to the user terminal that opens the document to be notified.

Step 505, update the content referenced by the target formula with the latest data.

In this embodiment, the execution actor may use the latest data to update the content referenced by the target formula so that the updated content of the referenced region may be presented in the currently presented document.

The method provided in the above embodiments of the present disclosure may obtain the latest data to update the content of the referenced region in the currently presented document when the content of the referenced region in the currently presented document is changed, thus ensuring the real-time update of the data.

With further reference to FIG. 6, a flow 600 of another embodiment according to the method information referencing of the present disclosure is shown. The method of information referencing, which is typically applied to a server, includes the following steps.

Step 601, in response to receiving an identification token and target information of a target formula sent by a user terminal, with the identification token and the target information of the target formula, verify a referencing permission of the target formula to obtain a first verification result.

In this embodiment, the execution actor of the method of information referencing (e.g., the server shown in FIG. 1) may determine whether it has received the identification token and target information of the target formula sent by the user terminal. The above target formula may be used to reference the content of the referenced document in the referencing document. The identification token of the above target formula is usually used to uniquely identify the target formula and may be characterized as a string. The above target information usually includes the user identification of the target user, the identification of the referencing document (currently presented document), the identification of the referenced document (data source document), and the identification of the referenced region, and the above target user may be a user who created the above target formula.

If the identification token and target information of the target formula sent by the user terminal are received, the execution actor may verify the referencing permission of the target formula to obtain the first verification result with the identification token and the target information of the target formula.

Step 602, return the first verification result to the user terminal.

In this embodiment, the execution actor may return the first verification result obtained in step 601 to the user terminal. After receiving the first verification result, the user terminal may perform information presentation in the referencing document based on the first verification result. If the first verification result characterizes verification failure, the execution actor may present the information of the verification failure in the referencing document. For example, the information of characterizing verification failure may include an error code, and one error code corresponds to one reason for the verification failure.

The method provided by the above embodiments of the present disclosure verifies the referencing permission of the target formula by using the identification token and target information of the target formula sent by the user terminal, and returns the verification result to the user terminal, so that the user terminal may perform information presentation in the referencing document based on the received verification result. Thus, a more concise and efficient cross-table referencing implementation scheme is achieved.

In some optional implementations, if the first verification result characterizes a successful verification, the first verification result includes a regional content of the referenced region in the referenced document. The execution actor may store the identification token of the target formula in association with the target information. That is, associate and store the five items of the following: the identification token of the above target formula, the user identification of the above target user, the identification of the referencing document (currently presented document), the identification of the referenced document (data source document) and the identification of the referenced region.

In some optional implementations, the above target information may also include a synchronous style identification, which may be used to characterize whether to synchronize a style of the referenced region when the content of the referenced region is referenced in the referencing document. If the synchronization style identification is "1" or "T", it may be used to characterize the synchronization of the style of the referenced region when the content of the referenced region is referenced in the referencing document. If the synchronization style identification is "0" or "F", it may characterize no synchronization of the style of the referenced region when the content of the referenced region is referenced in the referencing document. The style of the referenced region may include but is not limited to at least one of the following: a font of the referenced region, a font size of the referenced region, a font color of the referenced region, whether the referenced region is highlighted color, whether the referenced region is bolded, whether the referenced region is tilted, whether the referenced region is underlined, a paragraph format of the referenced region, and a background color of the referenced region.

In some optional implementations, the first verification result includes a verification result that characterizes whether the target user has a permission to reference a content in the referenced document. The execution actor may store a correspondence table with a correspondence between the identification of the document and the user identification who has the referencing permission to reference the content of the document. The execution actor may query in the correspondence table whether there is the correspondence between the user identification of the target user and the identification of the referenced document. If the correspondence exits, it may be determined that the target user has the permission to reference the content in the referenced document. At this time, the first verification result may be generated to characterize that the target user has the permission to reference the content in the referenced document. The first verification result may be characterized as 1 or T. If the correspondence does not exit, it may be determined that the target user does not have the permission to reference the content in the referenced document. At this time, the first verification result may be generated to characterize that the target user does not have the permission to reference the content in the referenced document. The first verification result may be characterized as 0 or F.

In some optional implementations, the first verification result may also include a verification result of a legality for the above target information. The target information usually includes the user identification of the target user, the identification of the referencing document, the identification of the referenced document, and the identification of the referenced region. The execution actor may verify the legality of the first target information in the following ways: the execution actor may verify whether the identification of the referenced document exists, and may also verify whether a referenced region indicated by the identification of the referenced region exceeds a document region of the referenced document. If the identification of the referenced document exists and the referenced region indicated by the identification of the referenced region does not exceed the document region of the referenced document, then the verification is successful. If the identification of the referenced document does not exist or the referenced region indicated by the identification of the referenced region exceeds the document region of the referenced document, then the verification has failed.

In some optional implementations, the above target formula may include a copy function, a table link and an identification of the referenced region, wherein the copy function is used to copy a content of a referenced table into a referenced table, and the table link is a link of the referenced table. The above target formula may be in the form of IMPORTRANGE(String spreadsheet_url, String range_string, (Optional) Boolean if_sync_formatting), herein, IMPORTRANGE is a copy function, which may copy a content in one table to another table; spreadsheet_url usually refers to the table link, which is Uniform Resource Locator (url) link of the data source table; range_string usually refers to a string of the referenced region, that is, the identification of the referenced region; if_sync_formatting usually refers to whether the synchronization style is used, the parameter whether the synchronization style is used is optional, whether synchronization style indicates whether the referenced region style is synchronized when the content of the data source table is referenced in a table. The style of referenced region may include but is not limited to at least one of the following: a font of the referenced region, a font size of referenced region, a font color of the referenced region, whether the referenced region is highlighted color, whether the referenced region is bolded, whether the referenced region is tilted, whether the referenced region is underlined, a paragraph format of the referenced region, and a background color of the referenced region.

In some optional implementations, the referencing document or the referenced document includes one of: a spreadsheet document, an online table document, or an online database table document.

Continuing with FIG. 7, a flow 700 of another embodiment of updating the referenced content according to the method of information referencing of the present disclosure is shown. The method of updating the referenced content, which is typically applied to a server, includes the following steps.

Step 701, in response to receiving a change instruction for the referenced region sent by the user terminal, with an identification of a changed document and a change region in the change instruction, query an identification of a corresponding document to be changed and an identification token of a target formula to be updated.

In this embodiment, the execution actor of the method of information referencing (e.g., the server shown in FIG. 1) may determine whether it has received the change instruction for the referenced region sent by the user terminal. When a target formula is created, the referencing relationship chain of the target formula (that is, the correspondence between the referenced document and the referenced document) is normally maintained in the above execution actor. When the content in the referenced region of the referenced document is changed, the above execution actor will usually receive the change instruction for the referenced region sent by the user terminal. The change instruction may include the identification of the changed document and the changed region. After that, the execution actor may use the identification of the changed document and the changed region in the above change instruction to query the identification of the corresponding document to be changed and the identification token of the target formula to be updated through the above referencing relationship chain.

Step 702, send an update instruction to a first target user terminal with the identification of the document to be changed.

In this embodiment, the execution actor may use the identification of the document to be changed to send the update instruction to the first target user terminal. The first target user terminal may be a user terminal whose currently presented document is a document to be changed indicated by the identification of the document to be changed, and the update instruction includes the identification token of the target formula to be updated.

After receiving the update instruction, the first target user terminal may use the identification token of the target formula to be updated in the update instruction to obtain latest data referenced by the target formula to be updated from the execution actor; after that, the first target user terminal may use the latest data to update the content referenced by the target formula to be updated in the currently presented document, so that the updated content of the referenced region may be displayed in the currently presented document.

The method provided by the above embodiments of the present disclosure may ensure the real-time update of data by querying the documents associated with the referenced region in the referenced document when the content of the referenced region in the referenced document is changed, so as to send update instructions to the user terminal where these documents are located.

Continuing with reference to FIG. 8, a flow 800 of an embodiment of verifying a viewing permission of the viewing user according to the method of information referencing of the present disclosure is shown. The method of verifying the viewing permission of the viewing user is usually applied to the server. The method of verifying the viewing permission of the viewing user includes the following steps.

Step 801, in response to receiving a user identification of a viewing user and an identification token of a viewed target formula, verify to obtain a second verification result with the user identification of the viewing user and the identification token of the viewed target formula.

In this embodiment, the execution actor of the method of information referencing (e.g., the server shown in FIG. 1) may determine whether the user identification of the viewing user and the identification token of the viewed target formula has been received.

If the user terminal detects that the user is viewing the content referenced by the target formula in the currently presented document, the user terminal may obtain the user identification of the viewing user and the identification token of the viewed target formula, and send the obtained user identification of the viewing user and the identification token of the viewed target formula to the execution actor.

As an example, if the user terminal detects that the user has opened a document and the target formula exists in the document, the user terminal may determine that the user is viewing the content referenced by the target formula in the currently presented document.

As another example, if the user terminal detects that the user is browsing the currently presented document and the browsed region is a region referenced by the target formula, the user terminal may determine that the user is viewing the content referenced by the target formula in the currently presented document.

If the user terminal receives the user identification of the viewing user and the identification token of the viewed target formula, then the execution actor may use the user identification of the viewing user and the identification token of the viewed target formula to verify and obtain the second verification result. The second verification result may characterize whether the viewing user has the permission to view the content referenced by the viewed target formula.

Specifically, the execution actor may use the identification token of the above viewed target formula to query the user identification set of the users who may view the content referenced by the above viewed target formula. Then, it may be determined whether the user identification of the above viewing user exists in the above user identification set. If the user identification of the viewing user exists in the user identification set, the execution actor may determine that the viewing user has the permission to view the content referenced by the viewed target formula. At this time, the execution actor may generate a verification result characterizing that the viewing user has the permission to view the content referenced by the viewed target formula. If the user identification of the viewing user does not exist in the user identification set, then the execution actor may determine that the viewing user does not have the permission to view the content referenced by the target formula. At this time, the execution actor may generate a verification result characterizing that the viewing user does not have the permission to view the content referenced by the viewed target formula.

In step 802, return the second verification result to a user terminal used by the viewing user.

In this embodiment, the execution actor may return the second verification result to the user terminal used by the viewing user. After receiving the second verification result, the user terminal may perform information presentation in the currently presented document based on the second verification result. Here, if the second verification result characterizes that the viewing user does not have the permission to view the content referenced by the viewed target formula, the user terminal may present information characterizing that the user does not have the viewing permission in the currently presented document.

The method provided by the above embodiments of the present disclosure ensures the security of the data by verifying the viewing permission of the viewing user who is viewing the content referenced by the target formula and returning the verification result to the user terminal used by the viewing user.

In some optional implementations, if the second verification result characterizes that the viewing user has the permission to view the content referenced by the viewed target formula, the second verification result may include the content referenced by the target formula viewed by the viewing user. The user terminal may perform information presentation in the currently presented document based on the second verification result in the following ways: the user terminal may present the content referenced by the target formula viewed by the viewing user in the currently presented document.

Continuing with reference to FIG. 9, a flow 900 of an embodiment of withdrawing the referencing permission of the target formula according to the method of information referencing of the present disclosure is shown. The method of withdrawing the referencing permission of the target formula is generally applied to the server, and the method of withdrawing the referencing permission of the target formula includes the following steps.

Step 901, in response to receiving a target instruction for a target formula sent by a user terminal, set an identification token of the target formula targeted by the target instruction to invalid.

In this embodiment, the execution actor of the method of information referencing (such as the server shown in FIG. 1) may determine whether it receives the target instruction for the target formula sent by the user terminal. The above target instruction may include a modification instruction or a deletion instruction. The target instruction is usually generated when the user terminal detects that the user is performing the target operation on the target formula, and the target operation may include the modification operation or the deletion operation.

If the target instruction for the target formula sent by the user terminal is received, the execution actor may set the identification token of the target formula targeted by the target instruction invalid.

Step 902, send a permission withdrawal instruction to a second target user terminal.

In this embodiment, the above execution actor may send a permission withdrawal instruction to the second target user terminal. The permission withdrawal instruction may include the identification token of the invalid target formula, and the permission withdrawal instruction is usually used to withdraw the referencing permission of the invalid target formula. The second target user terminal may be a user terminal with a currently presented document being a document in which the above invalid target formula is located.

If the second target user terminal receives the above permission withdrawal instruction, the second target user terminal may use the identification token of the invalid target formula in the above permission withdrawal instruction to withdraw the content referenced by the invalid target formula in the currently presented document. That is, it will not present the content referenced by the invalid target formula in the currently presented document.

The method provided by the above embodiments of the present disclosure, by receiving the instruction that the target formula is modified or deleted, may set the identification token of the target formula to invalid, and send the permission withdrawal instruction to the user terminal with the currently presented document being the document in which the above invalid target formula is located. In this way, the identification token of the modified or deleted target formula may be invalidated and cannot be recovered, which may prevent the illegal obtaining of data through the invalid identification token and ensure the security of data.

Continuing with reference to FIG. 10, a time sequence diagram of an embodiment according to a system for information referencing of the present disclosure is shown.

The system for information referencing of this embodiment includes: a user terminal configured to in response to creating a target formula, determine parameters of the target formula, with a first target information, generate an identification token of the target formula, send a second target information to a server, receive a first verification result returned by the server, and based on the first verification result, perform information presentation in the referencing document, wherein, the target formula is used to reference a content of a referenced document in a referencing document, and the parameters comprise an identification of the referenced document and an identification of a referenced region, the first target information comprises a user identification of a target user, an identification of the referencing document, the identification of the referenced document and the identification of the referenced region, the target user is a user creating the target formula, and the second target information comprises the identification token and the first target information; the server configured to in response to receiving the second target information, with the second target information, verify a referencing permission of the target formula to obtain the first verification result, and return the first verification result to the user terminal.

As shown in FIG. 10, in step 1001, the user terminal, in response to creating a target formula, determines parameters of the target formula.

In this embodiment, the user terminal may detect whether the user has created a target formula in the document. The above target formula may also be referred to as a cross-table referenced formula and may be used to reference the content of the referenced document in the referenced document. The above target formula may be in the form of IMPORTRANGE(String spreadsheet_url, String range_string, (Optional) Boolean if_sync_formatting), herein, IMPORTRANGE is a copy function, which may copy a content in one table to another table; spreadsheet_url usually refers to the table link, which is Uniform Resource Locator (url) link of the data source table; range_string usually refers to a string of the referenced region, that is, the identification of the referenced region; if_sync_formatting usually refers to whether the synchronization style is used, the parameter whether the synchronization style is used is optional, whether synchronization style indicates whether the referenced region style is synchronized when the content of the data source table is referenced in a table. The style of referenced region may include but is not limited to at least one of the following: a font of the referenced region, a font size of referenced region, a font color of the referenced region, whether the referenced region is highlighted color, whether the referenced region is bolded, whether the referenced region is tilted, whether the referenced region is underlined, a paragraph format of the referenced region, and a background color of the referenced region.

As an example, the user may create the target formula in the following way: the cross-table referencing selection panel may be presented in the document. The user may select the document as the referenced document and select a region in the referenced document as a referenced region in the cross-table reference selection panel of the current displayed document (referencing document); after that, click the "confirm" icon, and the target formula is created successfully.

As another example, the user may also create the target formula in the following way: the user may create the target formula by entering an identification of the referenced document (e.g., url) and a range of the referenced region in an edit box of the target formula.

Later, if the creation of the target formula is detected, the user terminal may determine the parameters of the target formula. The parameters may include the identification and referenced region of the referenced document.

As an example, if the target formula IMPORTRANGE is created ("xxx.com", "A1"), the user terminal may determine that the identification of the referenced document of the target formula is "xxx.com" and the identification of the referenced region is the region "A1".

As another example, if the target formula IMPORTRANGE(A1, B1) is created, the user terminal may obtain the identification of the referenced document from the cell A1 in the currently presented document, and the identification of the referenced region from the cell B1 in the currently presented document.

In step 1002, the user terminal generates an identification token of the target formula with a first target information.

In this embodiment, the user terminal may generate the identification token of the above target formula with the first target information. The identification token of the target formula is typically used to uniquely identify the target formula and may be characterized as a string. The first target information above usually includes a user identification of a target user, an identification of the referencing document (currently presented document), the identification of the referenced document (data source document), the identification of the referenced region, and the target user is a user creating the target formula.

Here, the user terminal may encrypt the user identification of the target user, the identifier of the referencing document, the identifier of the referenced document and the identifier of the referenced region with a predetermined encryption Algorithm to obtain the identification token of the target formula.

In step 1003, the user terminal sends the second target information to the server.

In this embodiment, the user terminal may send the second target information described above to the server. Here, the above second target information may include the above identification token and the above first target information. After the user performs an operation, the user terminal usually sends the operation instruction to the above server. Here, after the user executes the setcell action, the above second target information may be added to the operation instruction and sent to the above server.

In step 1004, the server, in response to receiving the second target information, with the second target information, verifies a referencing permission of the target formula to obtain the first verification result.

In this embodiment, the server may determine whether it has received the second target information sent by the user terminal. If the identification token and the first target information of the target formula sent by the user terminal are received, the execution actor may use the identification token and the first target information of the target formula to verify the referencing permission of the target formula to obtain the first verification result.

In step 1005, the server returns the first verification result to the user terminal.

In this embodiment, the server may return the first verification result obtained in step 1004 to the user terminal.

In Step 1006, the user terminal performs information presentation in the referencing document based on the first verification result.

In this embodiment, the user terminal may perform information presentation in the referencing document based on the first verification result described above. If the first verification result characterizes verification failure, the user terminal may present the information of the verification failure in the referencing document. For example, the information characterizing verification failure may include an error code, and one error code corresponds to one reason for the verification failure.

The above embodiments of the present disclosure provide a more concise and efficient cross-table referencing implementation scheme by creating the information reference relationship between documents, compared with the operation performed by the user by copying the content from one document to another document.

In some optional implementations, the user terminal may determine whether an update instruction is detected. The above update instruction may be used to update the content referenced by the target formula in the currently presented document. The above update instruction usually includes the identification token of the target formula to be updated. If an update instruction is detected, the user terminal may use the identification token of the target formula to be updated in the update instruction to obtain the latest data referenced by the target formula to be updated from the server. Here, when a target formula is created, a referencing relationship chain of the target formula is normally maintained in the above server. When the content in the referenced region of the referenced document is changed, the server usually obtains a notification of content changing, and find a document that needs to be changed through the referencing relationship chain as a document to be notified. The server may send the update instruction to the user terminal that opens the document to be notified. The user terminal may use the latest data to update the content referenced by the target formula to be updated in the currently presented document, so that the updated content of the referenced region may be presented in the currently presented document.

In some optional implementations, the update instruction may be generated by: in response to detecting that a current time is a predetermined time, generating the update instruction. If there is a target formula in the currently presented document, the user terminal may set a timer. If the current time is the predetermined time, the user terminal may request the latest data of the target formula in the currently presented document from the above server, so as to ensure the timeliness and effectiveness of the data update.

In some optional implementations, if the first verification result characterizes a successful verification, then the first verification result may include a regional content of the referenced region in the referenced document. The user terminal may perform information presentation in the referencing document based on the first verification result in the following ways: if the first verification result characterizes verification successful, the user terminal may present the regional content in the referencing document.

In some optional implementations, the second target information may also include a synchronization style identification used to characterize whether to synchronize a style of the referenced region when the content of the referenced region is referenced in the referencing document. If the synchronization style identification is "1" or "T", it may be used to characterize the synchronization of the style of the referenced region when the content of the referenced region is referenced in the referencing document. If the synchronization style identification is "0" or "F", it may characterize no synchronization of the style of the referenced region when the content of the referenced region is referenced in the referencing document. The style of the referenced region may include but is not limited to at least one of the following: a font of the referenced region, a font size of the referenced region, a font color of the referenced region, whether the referenced region is highlighted color, whether the referenced region is bolded, whether the referenced region is tilted, whether the referenced region is underlined, a paragraph format of the referenced region, and a background color of the referenced region.

In some optional implementations, the first verification result may also include a verification result of a legality for the first target information. The first target information usually includes the user identification of the target user, the identification of the referencing document, the identification of the referenced document, and the identification of the referenced region. The server may verify the legality of the first target information in the following ways: the server may verify whether the identification of the referenced document exists and may also verify whether a referenced region indicated by the identification of the referenced region exceeds the document region of the referenced document. If the identification of the referenced document exists and a referenced region indicated by the identification of the referenced region does not exceed the document region of the referenced document, the verification may be successful. If the identification of the referenced document does not exist or a referenced region indicated by the identification of the referenced region exceeds the document region of the referenced document, then the verification may be failed.

In some optional implementations, the first verification result may include a verification result that characterizes whether the target user has a permission to reference a content in the referenced document. The server may store a correspondence table with a correspondence between the identification of the document and the user identification who has the referencing permission to reference the content of the document. The server may query in the correspondence table whether there is the correspondence between the user identification of the target user and the identification of the referenced document. If the correspondence exists, it may be determined that the target user has the permission to reference the content in the referenced document. At this time, the first verification result may be generated to characterize that the target user has the permission to reference the content in the referenced document. The first verification result may be characterized as 1 or T. If the correspondence does not exist, it may be determined that the target user does not have the permission to reference the content in the referenced document. At this time, the first verification result may be generated to characterize that the target user does not have the permission to reference the content in the referenced document. The first verification result may be characterized as 0 or F.

In some optional implementations, if the first verification result characterizes a successful verification, the first verification result may include a regional content of the referenced region in the referenced document. The server may store the identification token of the target formula in association with the target information. That is, associate and store the five items of the following: the identification token of the above target formula, the user identification of the above target user, the identification of the referencing document (currently presented document), the identification of the referenced document (data source document) and the identification of the referenced region.

In some optional implementations, the above target formula may include a copy function, a table link, and an identification of the referenced region, wherein the copy function is used to copy a content of a referenced table into a referenced table, and the table link is a link of the referenced table. The above target formula may be in the form of IMPORTRANGE(String spreadsheet_url, String range_string, (Optional) Boolean if_sync_formatting), herein, IMPORTRANGE is a copy function, which may copy a content in one table to another table; spreadsheet_url usually refers to the table link, which is Uniform Resource Locator (url) link of the data source table; range_string usually refers to a string of the referenced region, that is, the identification of the referenced region; if_sync_formatting usually refers to whether the synchronization style is used, the parameter whether the synchronization style is used is optional, whether synchronization style indicates whether the referenced region style is synchronized when the content of the data source table is referenced in a table. The style of referenced region may include but is not limited to at least one of the following: a font of the referenced region, a font size of referenced region, a font color of the referenced region, whether the referenced region is highlighted color, whether the referenced region is bolded, whether the referenced region is tilted, whether the referenced region is underlined, a paragraph format of the referenced region, and a background color of the referenced region.

In some optional implementations, the referencing document or the referenced document includes one of: a spreadsheet document, an online table document, or an online database table document.

Figure 11:
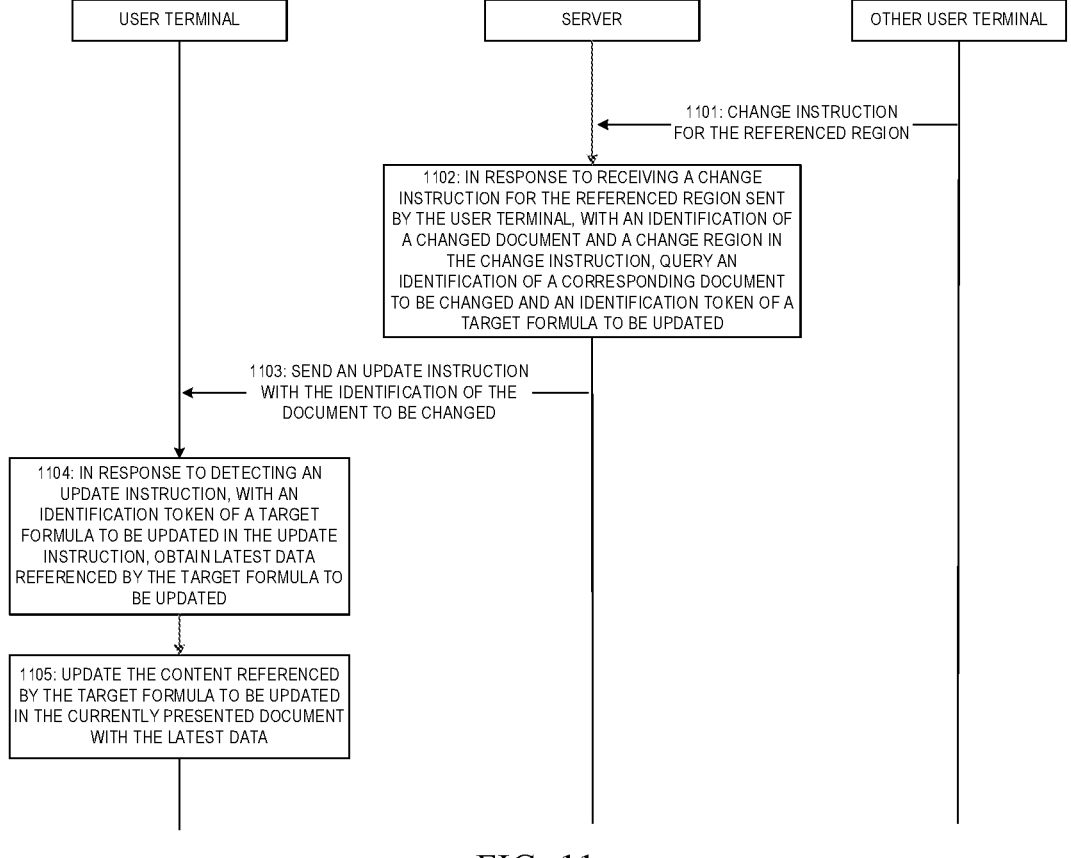
FIG. 11 is a time sequence diagram of an embodiment of updating a referenced content according to a system for information referencing of the present disclosure.

Continuing with FIG. 11, a timing diagram of an embodiment of updating a referenced content based on a system for information referencing of the present disclosure is shown.

The system for information referencing of the embodiments of the present disclosure also includes: other user terminals, where other user terminals include user terminals other than the user terminals mentioned above. The other user terminals are used to send a change instruction to the server for the referenced region in the referenced document.

As shown in FIG. 11, in step 1101, other user terminal sends the change instruction to the server for the referenced region.

In this embodiment, other user terminal may send the change instruction for the referenced region to the server. When a user makes a change to a content in a referenced region of a referenced document presented on another user terminal, a change instruction for the referenced region may be sent to the server. The above change instruction may include the identification and the changed region of the changed document.

In Step 1102, the server, in response to receiving a change instruction for the referenced region sent by the user terminal, with an identification of a changed document and a change region in the change instruction, queries an identification of a corresponding document to be changed and an identification token of a target formula to be updated.

In this embodiment, the server may determine whether it has received a change instruction for the referenced region sent by another user terminal. When a target formula is created, the referencing relationship chain of the target formula (that is, a correspondence between the referencing document and the referenced document) is normally maintained in the above execution actor. When the content in the referenced region of the referenced document is changed, the server usually receives the change instruction for the referenced region sent by the user terminal. The change instruction may include the identification and the changed region of the changed document. After that, the server may use the identification and changed region of the changed document in the above change instruction to query the identification of the corresponding document to be changed and the identification token of the target formula to be updated through the above referencing relationship chain.

In step 1103, the server sends an update instruction to the user terminal with the identification of the document to be changed.

In this embodiment, the server may use the identification of the document to be changed above to send the update instruction to the user terminal. The document currently presented by the user terminal is a document to be changed indicated by the identification of the document to be changed. In addition to sending the update instruction to the user terminal, the server may also send the update instruction to other first target user terminals whose currently presented documents are the document to be changed indicated by the identification of the document to be changed. The update instruction includes the identification token of the above target formula to be updated.

In Step 1104, the user terminal, in response to detecting an update instruction, with an identification token of a target formula to be updated in the update instruction, obtains latest data referenced by the target formula to be updated.

In this embodiment, the user terminal may determine whether the update instruction has been detected. The above update instruction may be used to update the content referenced by the target formula in the currently presented document. The above update instruction usually includes the identification token of the target formula to be updated.

If the update instruction is detected, the user terminal may use the identification token of the target formula to be updated in the update instruction to obtain the latest data referenced by the target formula to be updated from the server.

In Step 1105, the user terminal uses the latest data to update the content referenced by the target formula to be updated in the currently presented document.

In this embodiment, the user terminal may use the above latest data to update the content referenced by the target formula to be updated in the currently presented document, so that the updated content of the referenced region may be displayed in the currently presented document.

The system provided by the above embodiments of the present disclosure may obtain the latest data to update the content of the referencing region in the referencing document when the content of the referenced region in the referenced document is changed, thus ensuring real-time data update.

Figure 12:
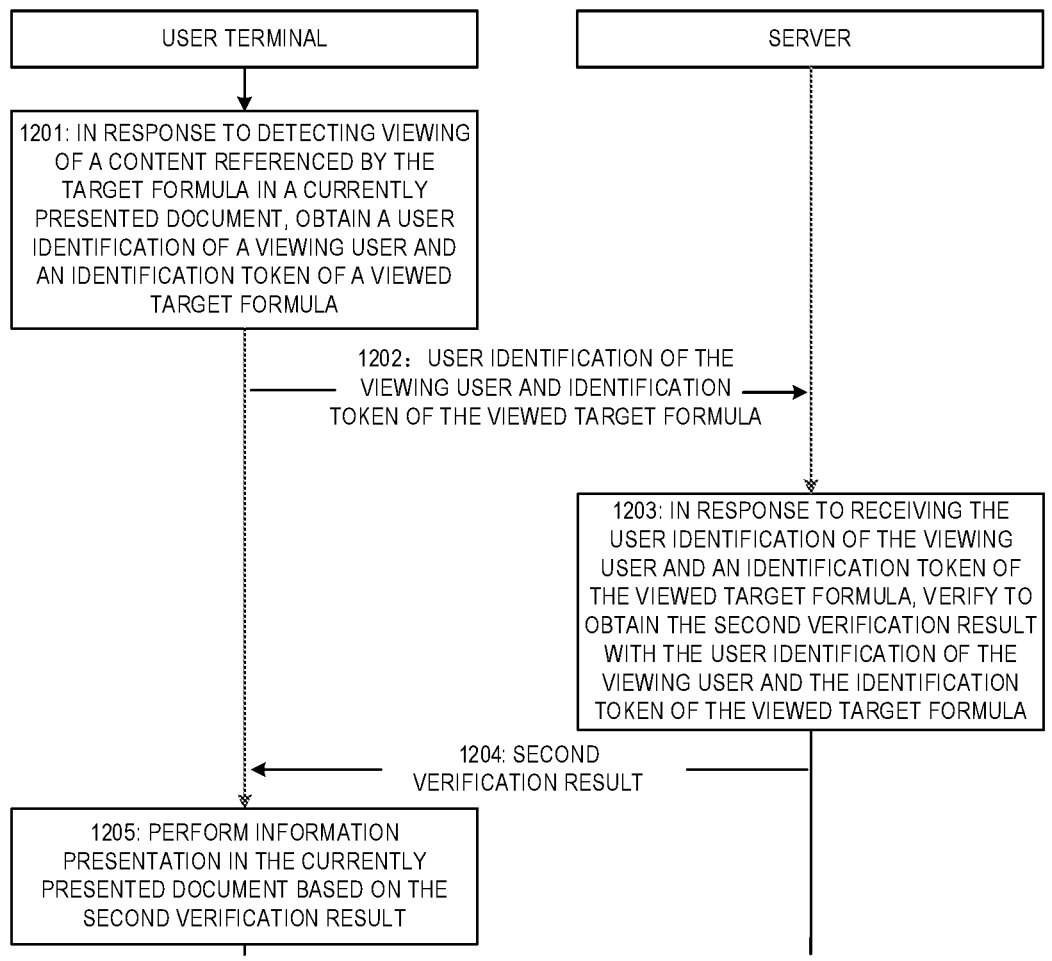
FIG. 12 is a time sequence diagram of an embodiment of viewing a target formula according to a system for information referencing of the present disclosure.

Continuing to refer to FIG. 12, a time sequence diagram of an embodiment of viewing the target formula according to a system for information referencing of the present disclosure is shown.

As shown in FIG. 12, in step 1201, the user terminal, in response to detecting viewing of a content referenced by the target formula in a currently presented document, obtains a user identification of a viewing user and an identification token of a viewed target formula.

In this embodiment, the user terminal may detect whether the user is viewing the content referenced by the target formula in the currently presented document.

As an example, if the user terminal detects that the user has opened a document and a target formula exists in that document, it may determine that the user is viewing the content referenced by the target formula in the currently presented document.

As another example, if the user terminal detects that the user is browsing the currently presented document and the browsed region is a region referenced by the target formula, it may determine that the user is viewing the content referenced by the target formula in the currently presented document.

If the user terminal detects that the user is viewing the content referenced by the target formula in the currently presented document, the user terminal may obtain the user identification of the viewing user and the identification token of the viewed target formula.

It should be noted that if the user is detected to open a document and the target formula exists in the document, it may be determined that the user is viewing the content referenced by the target formula in the currently presented document, the user terminal may obtain identification tokens of all the target formulas in the opened document.

In step 1202, the user terminal sends the user identification of the viewing user and the identification token of the viewed target formula to the server.

In this embodiment, the user terminal may send the user identification of the viewing user and the identification token of the viewed target formula to the server.

In step 1203, the server, in response to receiving the user identification of the viewing user and the identification token of the viewed target formula, verifies to obtain the second verification result with the user identification of the viewing user and the identification token of the viewed target formula.

In this embodiment, the server may determine whether it has received the user identification of the viewing user and the identification token of the viewed target formula. If the server receives the user identification of the viewing user and the identification token of the viewed target formula, the server may use the above user identification of the viewing user and the identification token of the viewed target formula to verify to obtain the second verification result. The second verification result may characterize whether the viewing user has a permission to view a content referenced by the viewed target formula.

Specifically, the server may use the identification token of the target formula to query the user identification set of the users who may view the content referenced by the viewed target formula. Then, it may be determined whether the user identification of the viewing user exists in the user identification set. If the user identification of the viewing user exists in the user identification set, the server may determine that the viewing user has the permission to view the content referenced by the viewed target formula. At this time, the server may generate a verification result characterizing that the viewing user has the permission to view the content referenced by the viewed target formula. If the user identification of the above viewing user does not exist in the above user identification set, then the server may determine that the above viewing user does not have the permission to view the content referenced by the above viewed target formula. At this time, the server may generate a verification result characterizing that the viewing user does not have the permission to view the content referenced by the viewed target formula.

In step 1204, the server returns the second verification result to the user terminal used by the viewing user.

In this embodiment, the server may return the second verification result above to the user terminal used by the viewing user.

In Step 1205, the user terminal performs information presentation in the currently presented document based on the second verification result.

In this embodiment, the user terminal may perform information presentation in the currently presented document based on the second verification result after receiving the second verification result described above. Here, if the second verification result characterizes that the viewing user does not have the permission to view the content referenced by the viewed target formula, the user terminal may present information in the currently presented document that indicates that the user does not have the viewing permission.

The system provided by the above embodiments of the present disclosure ensures the security of the data by verifying the viewing permission of the viewing user viewing the content referenced by the target formula and performing information presentation in the currently presented document based on the verification result.

In some optional implementations, if the second verification result characterizes that the viewing user has the permission to view the content referenced by the viewed target formula, the second verification result may include the content referenced by the target formula viewed by the viewing user. Based on the second verification result, the execution actor may perform information presentation in the currently presented document in the following ways: the execution actor may present the content referenced by the target formula viewed by the viewing user in the currently presented document.

Figure 13:
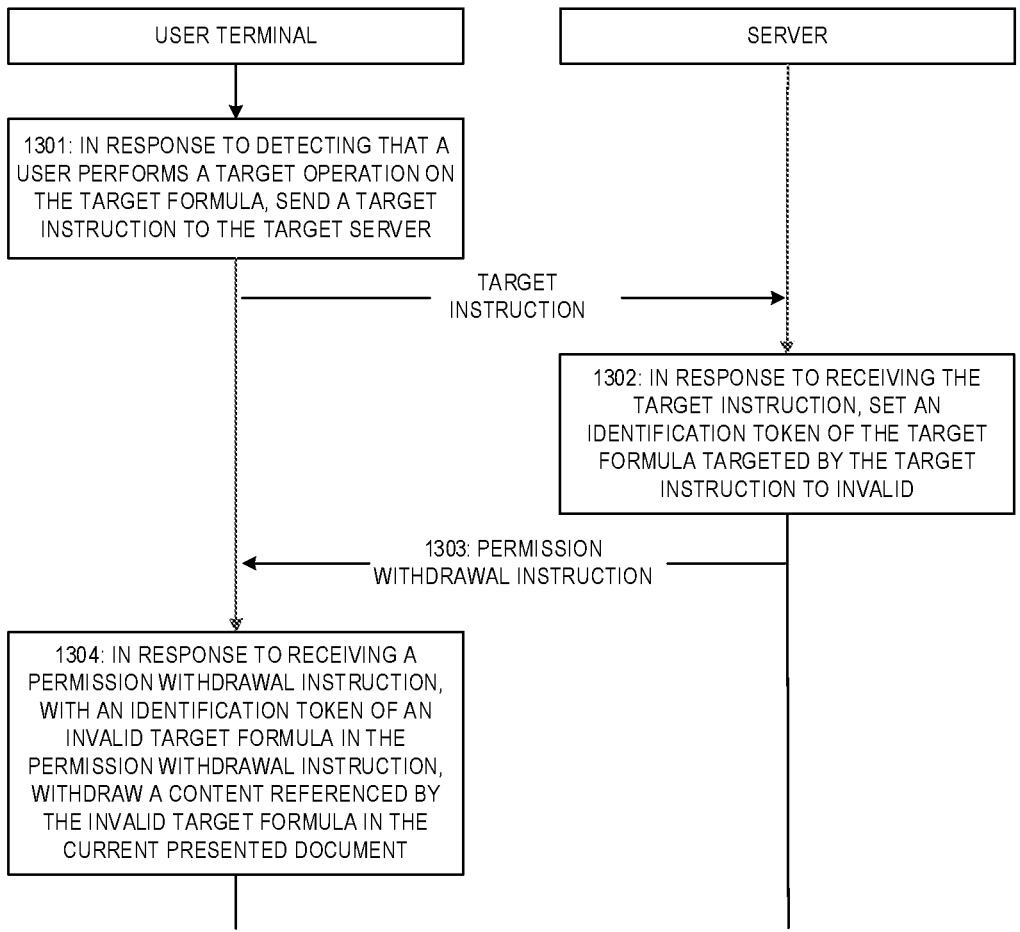
FIG. 13 is a time sequence diagram of an embodiment of withdrawing a referencing permission of a target formula according to a system for information referencing of the present disclosure.

Continuing to refer to FIG. 13, a time sequence diagram of an embodiment of withdrawing the referencing permission of the target formula according to a system for information referencing of the present disclosure is shown.

As shown in FIG. 13, in step 1301, the user terminal, in response to detecting that a user performs a target operation on the target formula, sends a target instruction to the target server.

In this embodiment, the user terminal may detect if the user performs the target operation on the target formula. The target operation may include a modification operation or a deletion operation, that is, the user terminal may detect whether the user performs the modification operation or deletion operation on the target formula. If the user is detected to perform the target operation on the target formula, the user terminal may send the target instruction to the target server. The target instruction may include a modification instruction or a deletion instruction for a target formula targeted by the target operation.

In Step 1302, the server, in response to receiving the target instruction, set an identification token of the target formula targeted by the target instruction to invalid.

In this embodiment, the server may determine whether it has received the target instruction for the target formula sent by the user terminal. If a target instruction sent by the user terminal for the target formula is received, the server may set the identification token of the target formula targeted by the target instruction to invalid.

In Step 1303, the server sends a permission withdrawal instruction to the user terminal.

In this embodiment, the server may send the permission withdrawal instruction to the user terminal mentioned above. The permission withdrawal instruction may include an identification token of an invalid target formula, and the permission withdrawal instruction is usually used to withdraw a referencing permission of the invalid target formula. The document current displayed on the above user terminal is a document in which the above invalid target formula is located. It should be noted that in addition to sending permission withdrawal instructions to the above user terminal, the server usually needs to send permission withdrawal instructions to other second target user terminals which currently presented document is the document where the above invalid target formula is located.

In Step 1304, the user terminal, in response to receiving a permission withdrawal instruction, with an identification token of an invalid target formula in the permission withdrawal instruction, withdraws a content referenced by the invalid target formula in the currently presented document.

In this embodiment, the user terminal may determine whether it has received a permission withdrawal instruction sent by the above server. If the user terminal receives the permission withdrawal instruction, the user terminal may use the identification token of the invalid target formula in the above permission withdrawal instruction to withdraw the content referenced by the invalid target formula in the currently presented document. That is, it does not display the content referenced by the invalid target formula in the currently presented document.

The system provided by the above embodiments of the present disclosure, by receiving the instruction that the target formula is modified or deleted, may set the identification token of the target formula to invalid and send the permission withdrawal instruction to the user terminal which currently presented document is the document in which the above invalid target formula is located. In this way, the identification token of the modified or deleted target formula is invalid and cannot be recovered, which may prevent the illegal obtaining of data through the invalid identification token and ensure the security of data.

In some optional implementations, after withdrawing the content referenced by the invalid target formula in the currently presented document, the user terminal may present a prompt information used to re-verify the referencing permission of the invalid target formula.

Figure 14:
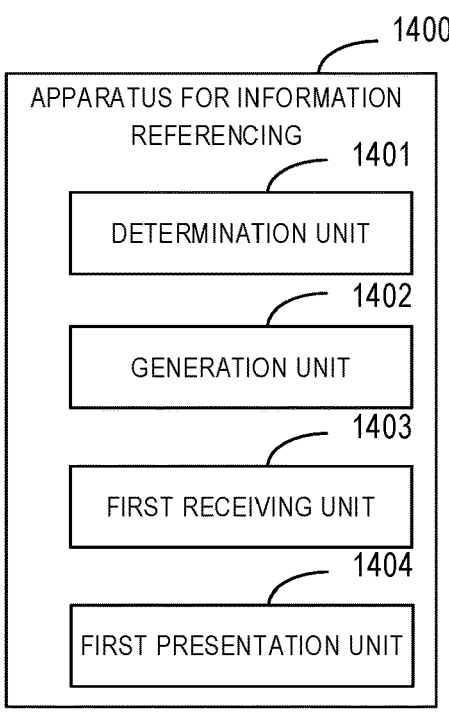
FIG. 14 is a structural schematic diagram of an embodiment according to an apparatus for information referencing of the present disclosure.

With further reference to FIG. 14, as an implementation of the methods shown in the above figures, the present disclosure provides an embodiment of an apparatus for information referencing corresponding to the method embodiment shown in FIG. 2. The apparatus may be specifically applied to various electronic devices.

As shown in FIG. 14, the apparatus for information referencing 1400 of the embodiments of the present disclosure includes: a determination unit 1401, a generation unit 1402, a receiving unit 1403 and a presentation unit 1404. Herein, the determination unit 1401 is configured to in response to creating a target formula, determine parameters of the target formula, wherein the target formula is used to reference a content of a referenced document in a referencing document, and the parameters include an identification of the referenced document and an identification of a referenced region; the generation unit 1402 is configured to generate an identification token of the target formula with a first target information, wherein the first target information includes a user identification of a target user, an identification of the referencing document, the identification of the referenced document and the identification of the referenced region, and the target user is a user creating the target formula; the first receiving unit 1403 is configured to receive a first verification result returned based on a second target information, wherein the second target information includes the identification token and the first target information; the first presentation unit 1404 is configured to perform information presentation in the referencing document based on the first verification result.

In this embodiment, the specific processing of the determination unit 1401, the generation unit 1402, the first receiving unit 1403 and the first presentation unit 1404 of the apparatus for information referencing 1400 may be referred to the steps 201, 202, 203 and 204 of the corresponding embodiment in FIG. 2.

In some optional implementations, the apparatus for information referencing 1400 may further include: a first obtaining unit (not shown in the figure) and an update unit (not shown in the figure). The first obtaining unit may be configured to in response to detecting an update instruction, with an identification token of a target formula to be updated in the update instruction, obtain latest data referenced by the target formula to be updated, wherein the update instruction is used to update a content referenced by the target formula in a currently presented document; the update unit may be configured to update the content referenced by the target formula to be updated in the currently presented document with the latest data.

In some optional implementations, the update instruction is generated by: in response to detecting that a current time is a predetermined time, generating the update instruction.

In some optional implementations, if the first verification result characterizes a successful verification, the first verification result includes a regional content of the referenced region in the referenced document; and the presentation unit 1404 may be configured to perform information presentation in the referencing document based on the first verification result in the following way: present the regional content in the referencing document.

In some optional implementations, the first receiving unit 1403 may be further configured to receive the first verification result returned based on the second target information in the following way: the above first receiving unit 1403 may send the second target information to a target server, wherein the target server generates and returns the first verification result based on the second target information.

In some optional implementations, the apparatus for information referencing 1400 may further include a second obtaining unit (not shown in the figure), a second receiving unit (not shown in the figure), and a second presentation unit (not shown in the figure). The second obtaining unit may be configured to in response to detecting viewing of a content referenced by the target formula in a currently presented document, obtain a user identification of a viewing user and an identification token of a viewed target formula; the second receiving unit may be configured to send the user identification of the viewing user and the identification token of the viewed target formula to the target server, and receiving a second verification result returned by the target server, wherein the second verification result characterizes whether the viewing user has a permission to view a content referenced by the viewed target formula; the second presentation unit may be configured to perform information presentation in the currently presented document based on the second verification result.

In some optional implementations, if the second verification result characterizes that the viewing user has the permission to view the content referenced by the viewed target formula, the second verification result includes a content referenced by a target formula viewed by the viewing user; and the second presentation unit may be further configured to perform information presentation in the currently presented document based on the second verification result in the following way: present the content referenced by the target formula viewed by the viewing user in the currently presented document.

In some optional implementations, the apparatus for information referencing 1400 may further include: a sending unit (not shown in the figure). The sending unit may send a target instruction to the target server, wherein the target operation includes a modification operation or a deletion operation, and the target instruction includes a modification instruction or a deletion instruction for a target formula targeted by the target operation.

In some optional implementations, the apparatus for information referencing 1400 may further include: a withdrawing unit (not shown in the figure). The withdrawing unit may, in response to receiving a permission withdrawal instruction, with an identification token of an invalid target formula in the permission withdrawal instruction, withdraw a content referenced by the invalid target formula in the currently presented document, wherein the permission withdrawal instruction includes the identification token of the invalid target formula, and the permission withdrawal instruction is used to withdraw a referencing permission of the invalid target formula.

In some alternative implementations, the apparatus for information referencing 1400 may further include: a third presentation unit (not shown in the figure). The third presentation unit may present prompt information used to prompt to re-verify the referencing permission of the invalid target formula.

In some optional implementations, the second target information may further include a synchronization style identification used to characterize whether to synchronize a style of the referenced region when the content of the referenced region is referenced in the referencing document.

In some alternative implementations, the first verification result includes a verification result that characterizes whether the target user has a permission to reference a content in the referenced document.

In some optional implementations, the first verification result further includes a verification result of a legality for the first target information.

In some alternative implementations, the target formula includes a copy function, a table link and an identification of the referenced region, wherein the copy function is used to copy a content of a referenced table into a reference table, and the table link is a link of the referenced table.

In some alternative implementations, the referencing document or the referenced document includes one of: a spreadsheet document, an online table document, or an online database table document.

Figure 15:
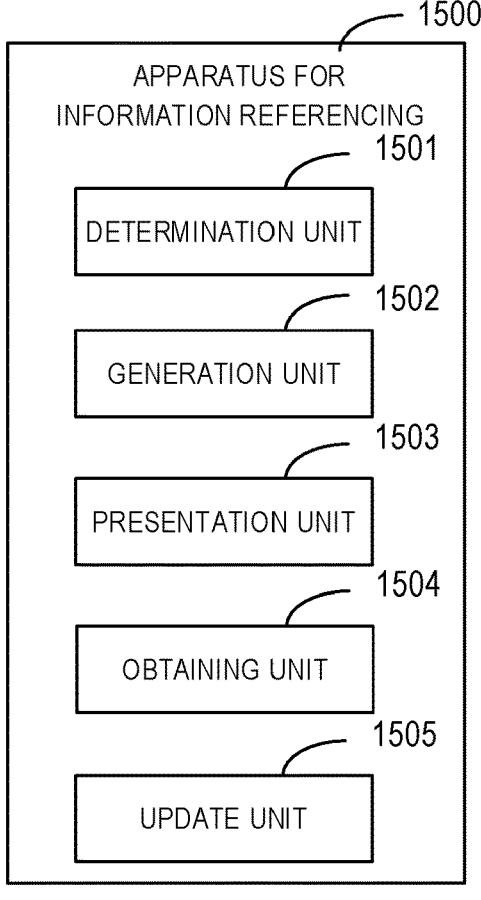
FIG. 15 is a structural schematic diagram of another embodiment according to an apparatus for information referencing of the present disclosure.

With further reference to FIG. 15, as an implementation of the method shown in each figure, the present disclosure provides another embodiment of an apparatus for information referencing corresponding to the method embodiment shown in FIG. 5. The apparatus may be specifically applied to various electronic devices.

As shown in FIG. 15, the apparatus for information referencing 1500 of this embodiment includes: a determination unit 1501, a generation unit 1502, a presentation unit 1503, an obtaining unit 1504 and an update unit 1505. The determination unit 1501 is configured to in response to creating a target formula, determine parameters of the target formula, wherein the target formula is used to reference a content of a referenced document in a referencing document, and the parameters include an identification of the referenced document and an identification of a referenced region; the generation unit 1502 is configured to generate an identification token of the target formula with a first target information, wherein the first target information includes a user identification of a target user, an identification of the referencing document, the identification of the referenced document and the identification of the referenced region, and the target user is a user creating the target formula; the presentation unit 1503 is configured to present a content of the referenced region in the referencing document based on the identification token and the first target information; the obtaining unit 1504 is configured to in response to detecting an update instruction, obtain latest data referenced by the target formula, wherein the update instruction is used to update the content of the referenced region; the update unit 1505 is configured to update the content referenced by the target formula with the latest data.

Figures 16, 17:
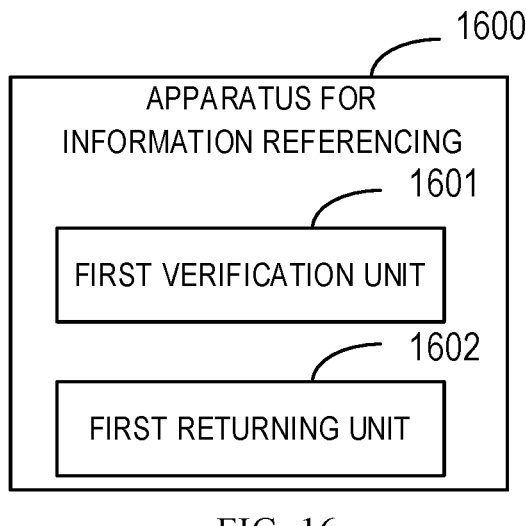
FIG. 16 is a structural schematic diagram of another embodiment according to an apparatus for information referencing of the present disclosure.
FIG. 17 is a structural schematic diagram of a computer system of the electronic device suitable for implementing the embodiments of the present disclosure.

With further reference to FIG. 16, as an implementation of the method shown in each figure, the present disclosure provides another embodiment of an apparatus for information referencing corresponding to the method embodiment shown in FIG. 6. The apparatus may be specifically applied to various electronic devices.

As shown in FIG. 16, the apparatus for information referencing 1600 of the embodiments of the present disclosure includes: a first verification unit 1601 and a first returning unit 1602. Herein, the first verification unit 1601 is configured to in response to receiving an identification token and target information of a target formula sent by a user terminal, with the identification token and the target information of the target formula, verify a referencing permission of the target formula to obtain a first verification result, wherein the target formula is used to reference a content of a referenced document in a referencing document, the target information includes a user identification of a target user, an identification of the referencing document, an identification of the referenced document and an identification of a referenced region, and the target user is a user creating the target formula; the first returning unit 1602 is configured to return the first verification result to the user terminal.

In this embodiment, the specific processing of the first verification unit 1601 and the first returning unit 1602 of the apparatus for information referencing 1600 may be referred to the steps 501 and 502 of the corresponding embodiment in FIG. 6.

In some optional implementations, the apparatus for information referencing 1600 may include: a storage unit (not shown in Figure). If the first verification result characterizes a successful verification, the first verification result includes a regional content of the referenced region in the referenced document. The storage unit may be configured to store the identification token of the target formula in association with the target information.

In some optional implementations, the apparatus for information referencing 1600 may include: a query unit (not shown) and a first sending unit (not shown). The query unit may be configured to in response to receiving a change instruction for the referenced region sent by the user terminal, with an identification of a changed document and a change region in the change instruction, query an identification of a corresponding document to be changed and an identification token of a target formula to be updated; the first sending unit may be configured to send an update instruction to a first target user terminal with the identification of the document to be changed, wherein the first target user terminal is a user terminal with a currently presented document being the document to be changed, and the update instruction includes the identification token of the target formula to be updated.

In some optional implementations, the apparatus for information referencing 1600 may include: a second verification unit (not shown in the figure) and a second returning unit (not shown in the figure). The second verification unit may be configured to in response to receiving a user identification of a viewing user and an identification token of a viewed target formula, verify to obtain a second verification result with the user identification of the viewing user and the identification token of the viewed target formula, wherein the second verification result characterizes whether the viewing user has a permission to view a content referenced by the viewed target formula; the second returning unit may be configured to return the second verification result to a user terminal used by the viewing user.

In some optional implementations, if the second verification result characterizes that the viewing user has a permission to view the content referenced by the viewed target formula, the second verification result includes a content referenced by a target formula viewed by the viewing user.

In some alternative implementations, the apparatus for information referencing 1600 may include: a setting unit (not shown in the figure) and a second sending unit (not shown in the figure). The setting unit may be configured to in response to receiving a target instruction for a target formula sent by a user terminal, set an identification token of the target formula targeted by the target instruction to invalid, wherein the target instruction includes a modification instruction or a deletion instruction; the second sending unit may be configured to send a permission withdrawal instruction to a second target user terminal, wherein the permission withdrawal instruction includes an identification token of an invalid target formula, the permission withdrawal instruction is used to withdraw a referencing permission of the invalid target formula, and the second target user terminal is a user terminal with a currently presented document being a document in which the invalid target formula is located.

In some optional implementations, the target information further includes a synchronization style identification used to characterize whether to synchronize a style of the referenced region when the content of the referenced region is referenced in the referencing document.

In some optional implementations, the first verification result includes a verification result that characterizes whether the target user has a permission to reference a content in the referenced document.

In some optional implementations, the first verification result further includes a verification result of a legality for the target information.

In some optional implementations, the target formula includes a copy function, a table link and an identification of the referenced region, wherein the copy function is used to copy a content of a referenced table into a referenced table, and the table link is a link of the referenced table.

In some optional implementations, the referencing document or the referenced document includes one of a spreadsheet document, an online table document, or an online database table document.

Below with reference to FIG. 17, which shows a schematic structural diagram of an electronic device 1700 (such as the server or terminal device in FIG. 1) suitable for implementing the embodiments of the present disclosure. The terminal device in the embodiments of the present disclosure may include, without limitation to, a mobile terminal such as a mobile phone, a laptop computer, a digital broadcast receiver, a PDA (personal digital assistant), a PAD (tablet computer), a PMP (portable multimedia player), an on-board terminal (e.g., on-board navigation terminal) and the like, as well as a fixed terminal such as a digital TV, a desktop computer and the like. The electronic device shown in FIG. 17 is merely an example and should not be construed to impose any limitations on the functionality and use scope of the embodiments of the present disclosure.

As shown in FIG. 17, the electronic device may comprise processing apparatus (e.g., a central processor, a graphics processor) 1701 which is capable of performing various appropriate actions and processes in accordance with programs stored in a read only memory (ROM) 1702 or programs loaded from storage apparatus 1708 to a random access memory (RAM) 1703. In the RAM 1703, there are also stored various programs and data required by the electronic device 1700 when operating. The processing apparatus 1701, the ROM 1702 and the RAM 1703 are connected to one another via a bus 1704. An input/output (I/O) interface 1705 is also connected to the bus 1704.

Usually, the following means may be connected to the I/O interface 1705: input apparatus 1706 including a touch screen, a touch pad, a keyboard, a mouse, a camera, a microphone, an accelerometer, a gyroscope, or the like; output apparatus 1707, such as a liquid-crystal display (LCD), a loudspeaker, a vibrator, or the like; and communication apparatus 1709. The communication apparatus 1709 allows the electronic device 1700 to perform wireless or wired communication with other device so as to exchange data with another device. While FIG. 17 shows the electronic device 1700 with various means, it should be understood that it is not required to implement or have all of the illustrated means. Alternatively, more or less means may be implemented or exist. Each block shown in FIG. 17 may characterize one apparatus or multiple apparatuses as needed.

Specifically, according to the embodiments of the present disclosure, the procedures described with reference to the flowchart may be implemented as computer software programs. For example, the embodiments of the present disclosure comprise a computer program product that comprises a computer program embodied on a non-transitory computer-readable medium, the computer program including program codes for executing the method shown in the flowchart. In such an embodiment, the computer program may be loaded and installed from a network via the communication apparatus 1009, or installed from the storage apparatus 1008, or installed from the ROM 1002. The computer program, when executed by the processing apparatus 1001, perform the above functions defined in the method of the embodiments of the present disclosure. It should be noted that the computer readable medium of the present disclosure can be a computer readable signal medium, a computer readable storage medium or any combination thereof. The computer readable storage medium may be, for example, but is not limited to, an electronic, magnetic, optical, electromagnetic, infrared or semiconductor system, apparatus or device, or any combination of the foregoing. More specific examples of the computer readable storage medium may include, without limitation to, the following: an electrical connection with one or more conductors, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer readable storage medium may be any tangible medium including or storing a program that may be used by or in conjunction with an instruction executing system, apparatus, or device. In the present disclosure, the computer readable signal medium may include data signals propagated in the baseband or as part of the carrier waveform, in which computer readable program code is carried. Such propagated data signals may take a variety of forms, including without limitation to electromagnetic signals, optical signals, or any suitable combination of the foregoing. The computer readable signal medium may also be any computer readable medium other than a computer readable storage medium that may send, propagate, or transmit a program for use by, or in conjunction with, an instruction executing system, apparatus, or device. The program code contained on the computer readable medium may be transmitted by any suitable medium, including, but not limited to, a wire, a fiber optic cable, RF (radio frequency), etc., or any suitable combination thereof.

The above computer readable medium may be contained in the above electronic device; or it may exist separately and not be assembled into the electronic device. The above computer readable medium carries one or more programs which, when executed by the electronic device, cause the electronic device to: in response to creating a target formula, determine parameters of the target formula, wherein the target formula is used to reference a content of a referenced document in a referencing document, and the parameters comprise an identification of the referenced document and an identification of a referenced region; generate an identification token of the target formula with a first target information, wherein the first target information comprises a user identification of a target user, an identification of the referencing document, the identification of the referenced document and the identification of the referenced region, and the target user is a user creating the target formula; receive a first verification result returned based on a second target information, wherein the second target information comprises the identification token and the first target information; and perform information presentation in the referencing document based on the first verification result.

When one or more of the above programs are performed by the electronic device, it also causes the electronic device to: in response to creating a target formula, determine parameters of the target formula, wherein the target formula is used to reference a content of a referenced document in a referencing document, and the parameters comprise an identification of the referenced document and an identification of a referenced region; generate an identification token of the target formula with a first target information, wherein the first target information comprises a user identification of a target user, an identification of the referencing document, the identification of the referenced document and the identification of the referenced region, and the target user is a user creating the target formula; present a content of the referenced region in the referencing document based on the identification token and the first target information; in response to detecting an update instruction, obtain latest data referenced by the target formula, wherein the update instruction is used to update the content of the referenced region; and update the content referenced by the target formula with the latest data.

When one or more of the above programs are performed by the electronic device, it also causes the electronic device to: in response to receiving an identification token and target information of a target formula sent by a user terminal, with the identification token and the target information of the target formula, verify a referencing permission of the target formula to obtain a first verification result, wherein the target formula is used to reference a content of a referenced document in a referencing document, the target information comprises a user identification of a target user, an identification of the referencing document, an identification of the referenced document and an identification of a referenced region, and the target user is a user creating the target formula; and return the first verification result to the user terminal.

Computer program code for carrying out operations of the present disclosure may be written in one or more program designing languages or a combination thereof, which include without limitation to an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods and computer program products according to various embodiments of the present disclosure. In this regard, each block in the flowchart or block diagrams may characterize a module, segment, or portion of code, which comprises one or more executable instructions for implementing the specified logical function(s). It should also be noted that, in some optional implementations, the functions noted in the block may occur out of the order noted in the figures. For example, two blocks shown in succession may, in fact, be executed substantially concurrent, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Units involved in the embodiments of the present disclosure as described may be implemented in software or hardware. The described unit may also be set in a processor. For example, a processor may be described as comprising a determination unit, a generation unit, a first receiving unit and a first presentation unit, and a processor may also be described as comprising a first verification unit and a first returning unit. Herein, the name of a unit does not form any limitation on the module itself, for example, the first presentation unit may also be described as "a unit performing information presentation in a referencing document based on a first verification result".

The foregoing description is merely illustration of the preferred embodiments of the present disclosure and the technical principles used herein. Those skilled in the art should understand that the disclosure scope involved therein is not limited to the technical solutions formed from a particular combination of the above technical features, but should also cover other technical solutions formed by any combination of the above technical features or their equivalent features without departing from the above disclosure concepts, e.g., technical solutions formed by replacing the above features with technical features having similar functions disclosed (without limitation) in the present disclosure.

We claim:

1. A method of information referencing implemented on a computing system for data synchronization in an online collaborative spreadsheet environment, comprising:

in response to creating a target formula, determining parameters of the target formula, wherein the target formula is used to reference a content of a referenced document in a referencing document, and the parameters comprise an identification of the referenced document and an identification of a referenced region;

generating an identification token of the target formula with a first target information, wherein the first target information comprises a user identification of a target user, an identification of the referencing document, the identification of the referenced document and the identification of the referenced region, and the target user is a user creating the target formula;

presenting a content of the referenced region in the referencing document based on the identification token and the first target information;

in response to detecting an update instruction, obtaining latest data referenced by the target formula, wherein the update instruction is used to update the content of the referenced region by updating a user interface of the online collaborative spreadsheet environment to display the referenced content;

updating the content referenced by the target formula with the latest data in the user interface of the online collaborative spreadsheet environment; and in response to receiving a permission withdrawal instruction, with an identification token of an invalid target formula in the permission withdrawal instruction, withdrawing a content referenced by the invalid target formula in a currently presented document, wherein the permission withdrawal instruction is processed by the computing system to invalidate the identification token and prevent display of the referenced content in the user interface of the online collaborative spreadsheet environment and the permission withdrawal instruction comprises the identification token of the invalid target formula, and the permission withdrawal instruction is used to withdraw a referencing permission of the invalid target formula.

2. A method of information reference implemented on a computing system for data synchronization in an online collaborative spreadsheet environment, comprising:

in response to receiving an identification token and target information of a target formula sent by a user terminal, with the identification token and the target information of the target formula, verifying a referencing permission of the target formula to obtain a first verification result, wherein the verifying comprises a cryptographic verification process to validate access rights based on the identification token and the target information, wherein the target formula is used to reference a content of a referenced document in a referencing document, the target information comprises a user identification of a target user, an identification of the referencing document, an identification of the referenced document and an identification of a referenced region, and the target user is a user creating the target formula;

returning the first verification result to the user terminal to enable display of the referenced content in a user interface of the online collaborative spreadsheet environment; and in response to receiving a target instruction for a target formula sent by a user terminal, setting an identification token of the target formula targeted by the target instruction to invalid, wherein the target instruction comprises a modification instruction or a deletion instruction; and sending a permission withdrawal instruction to a second target user terminal, wherein the permission withdrawal instruction is processed by the computing system to invalidate the identification token and prevent display of the referenced content in the user interface of the online collaborative spreadsheet environment and the permission withdrawal instruction comprises an identification token of an invalid target formula, the permission withdrawal instruction is used to withdraw a referencing permission of the invalid target formula, and the second target user terminal is a user terminal with a currently presented document being a document in which the invalid target formula is located.

3. The method of claim 2, wherein if the first verification result characterizes a successful verification, the first verification result comprises a regional content of the referenced region in the referenced document; and the method further comprises:

storing the identification token of the target formula in association with the target information.

4. The method of claim 2, further comprising:

in response to receiving a change instruction for the referenced region sent by the user terminal, with an identification of a changed document and a change region in the change instruction, querying an identification of a corresponding document to be changed and the identification token of the target formula to be updated; and sending an update instruction to a first target user terminal with the identification of the document to be changed, wherein the first target user terminal is a user terminal with a currently presented document being the document to be changed, and the update instruction comprises the identification token of the target formula to be updated.

5. The method of claim 2, further comprising:

in response to receiving a user identification of a viewing user and an identification token of a viewed target formula, verifying to obtain a second verification result with the user identification of the viewing user and the identification token of the viewed target formula, wherein the second verification result characterizes whether the viewing user has a permission to view a content referenced by the viewed target formula; and returning the second verification result to a user terminal used by the viewing user.

6. A method of information referencing implemented on a computing system for data synchronization in an online collaborative spreadsheet environment, comprising:

in response to creating a target formula, determining parameters of the target formula, wherein the target formula is used to reference a content of a referenced document in a referencing document, and the parameters comprise an identification of the referenced document and an identification of a referenced region;

generating an identification token of the target formula with a first target information, wherein the first target information comprises a user identification of a target user, an identification of the referencing document, the identification of the referenced document and the identification of the referenced region, and the target user is a user creating the target formula;

transmitting second target information comprising the first target information and the identification token to a target server for permission verification, wherein the target server performs a cryptographic verification process to validate access rights based on the second target information;

receiving a first verification result returned from the target server based on the second target information;

performing information presentation in the referencing document based on the first verification result by updating a user interface of the online collaborative spreadsheet environment to display the referenced content in response to the first verification result indicates successful verification; and in response to receiving a permission withdrawal instruction, with an identification token of an invalid target formula in the permission withdrawal instruction, withdrawing a content referenced by the invalid target formula in a currently presented document, wherein the permission withdrawal instruction is processed by the computing system to invalidate the identification token and prevent display of the referenced content in the user interface of the online collaborative spreadsheet environment and comprises the identification token of the invalid target formula, and the permission withdrawal instruction is used to withdraw a referencing permission of the invalid target formula.

7. The method of claim 6, further comprising:

in response to detecting an update instruction, with the identification token of the target formula to be updated in the update instruction, obtaining latest data referenced by the target formula to be updated, wherein the update instruction is used to update the content referenced by the target formula in the currently presented document; and updating the content referenced by the target formula to be updated in the currently presented document with the latest data.

8. The method of claim 7, wherein the update instruction is generated by:

in response to detecting that a current time is a predetermined time, generating the update instruction.

9. The method of claim 6, wherein if the first verification result characterizes a successful verification, the first verification result comprises a regional content of the referenced region in the referenced document; and performing information presentation in the referencing document based on the first verification result comprises:

presenting the regional content in the referencing document.

10. The method of claim 6, further comprising:

in response to detecting viewing of the content referenced by the target formula in the currently presented document, obtaining a user identification of a viewing user and an identification token of a viewed target formula;

sending the user identification of the viewing user and the identification token of the viewed target formula to the target server, and receiving a second verification result returned by the target server, wherein the second verification result characterizes whether the viewing user has a permission to view a content referenced by the viewed target formula; and performing information presentation in the currently presented document based on the second verification result.

11. The method of claim 10, wherein if the second verification result characterizes that the viewing user has the permission to view the content referenced by the viewed target formula, the second verification result comprises a content referenced by a target formula viewed by the viewing user; and performing information presentation in the currently presented document based on the second verification result comprises:

presenting the content referenced by the target formula viewed by the viewing user in the currently presented document.

12. The method of claim 6, further comprising:

in response to detecting that a user performs a target operation on the target formula, sending a target instruction to the target server, wherein the target operation comprises a modification operation or a deletion operation, and the target instruction comprises a modification instruction or a deletion instruction for a target formula targeted by the target operation.

13. The method of claim 6, wherein after withdrawing the content referenced by the invalid target formula in the currently presented document, the method further comprises:

presenting prompt information used to prompt to re-verify the referencing permission of the invalid target formula.

14. The method of claim 6, wherein the second target information further comprises a synchronization style identification used to characterize whether to synchronize a style of the referenced region when the content of the referenced region is referenced in the referencing document.

15. The method of claim 6, wherein the first verification result comprises a verification result that characterizes whether the target user has a permission to reference a content in the referenced document.

16. The method of claim 6, wherein the first verification result further comprises a verification result of a legality for the first target information.

17. The method of claim 6, wherein the target formula comprises a copy function, a table link and an identification of the referenced region, wherein the copy function is used to copy a content of a referenced table into a reference table, and the table link is a link of the referenced table.

18. The method of claim 6, wherein the referencing document or the referenced document comprises one of: a spreadsheet document, an online table document, or an online database table document.

\* \* \* \* \*